US012249293B2

(12) United States Patent
Tsuchi

(10) Patent No.: US 12,249,293 B2
(45) Date of Patent: Mar. 11, 2025

(54) DIGITAL-TO-ANALOG CONVERTER, DATA DRIVER, AND DISPLAY DEVICE

(71) Applicant: LAPIS Technology Co., Ltd., Yokohama (JP)

(72) Inventor: Hiroshi Tsuchi, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/630,997

(22) Filed: Apr. 9, 2024

(65) Prior Publication Data

US 2024/0355305 A1 Oct. 24, 2024

(30) Foreign Application Priority Data

Apr. 12, 2023 (JP) ................................ 2023-064830

(51) Int. Cl.
*G09G 3/36* (2006.01)
*G09G 3/3275* (2016.01)

(52) U.S. Cl.
CPC ......... *G09G 3/3688* (2013.01); *G09G 3/3275* (2013.01); *G09G 2310/027* (2013.01); *G09G 2310/0297* (2013.01)

(58) Field of Classification Search
CPC ...... G09G 3/3233; G09G 3/20; G09G 3/3688; G09G 3/3648; G09G 3/36; G09G 3/3291;
(Continued)

(56) References Cited

U.S. PATENT DOCUMENTS

2006/0132344 A1* 6/2006 Ishii ........................ H03M 1/76 341/144
2006/0250289 A1* 11/2006 Tsuchi .................. H03M 1/662 341/144

(Continued)

FOREIGN PATENT DOCUMENTS

JP 2006310959 11/2006
JP 2008122455 5/2008

*Primary Examiner* — Dong Hui Liang
(74) *Attorney, Agent, or Firm* — JCIPRNET

(57) ABSTRACT

A digital-to-analog converter for effectively performing offset cancellation driving to reduce output variations includes: a decoder receiving a K-bit digital data signal and first and second voltages and generating $2^K$ voltages each indicating the first or second voltage according to the digital data signal; and a differential amplifier outputting an output voltage having one of $2^K$ voltage levels obtained by dividing the voltage between the first and second voltages into $2^K$ voltage levels. The differential amplifier includes a MUX receiving $2^K$ voltages, $2^K$ differential pairs, and an amplification stage to which outputs of the $2^K$ differential pairs are supplied. The MUX performs voltage supply to input terminals of each differential pair to actively cause that, in each differential pair, the input voltage to one input terminal in a first state differs from the input voltage to the other input terminal in a subsequent second state.

13 Claims, 21 Drawing Sheets

(58) Field of Classification Search
CPC .. G09G 3/3275; G09G 3/3225; G09G 3/3614; G09G 3/3208; G09G 3/3266; G09G 3/32; G09G 2320/0233; G09G 2320/0276; G09G 2320/043; G09G 2320/0285; G09G 2320/0626; G09G 2310/027; G09G 2310/08; G09G 2310/0291; G09G 2300/0842; G09G 2300/0426; G09G 2300/0819; G09G 2360/16
See application file for complete search history.

(56) References Cited

U.S. PATENT DOCUMENTS

2021/0074198 A1* 3/2021 Tsuchi ................. G09G 3/2003
2022/0036801 A1* 2/2022 Tsuchi .................. H03M 1/765

* cited by examiner

| | Input volta | | Corresponding voltage | |
|---|---|---|---|---|
| Differential pair | CP1 | CP2 | CP1 | CP2 |
| First differential pair | V(TL1) | V(TR1) | V<1> | V<3> |
| Second differential pair | V(TL2) | V(TR2) | V<2> | V<4> |
| Third differential pair | V(TL3) | V(TR3) | V<3> | V<1> |
| Fourth differential pair | V(TL4) | V(TR4) | V<4> | V<2> |

FIG. 4B

| Digital value of the digital data signal DT | | | | | | | | | | |
|---|---|---|---|---|---|---|---|---|---|---|
| D1 | | | 0 | | 0 | | 1 | | 1 | |
| D0 | | | 0 | | 1 | | 0 | | 1 | |
| | Input voltage level | | Voltage level: corresponding voltage level in the case of VA=0 and VB=4 | | | | | | | |
| Differential pair | CP1 | CP2 | CP1 | CP2 | CP1 | CP2 | CP1 | CP2 | CP1 | CP2 |
| First differential pair | V(TL1) | V(TR1) | 4 | 0 | 4 | 0 | 4 | 4 | 4 | 4 |
| Second differential pair | V(TL2) | V(TR2) | 0 | 0 | 4 | 0 | 4 | 0 | 4 | 4 |
| Third differential pair | V(TL3) | V(TR3) | 0 | 4 | 0 | 4 | 4 | 4 | 4 | 4 |
| Fourth differential pair | V(TL4) | V(TR4) | 0 | 0 | 0 | 4 | 0 | 4 | 4 | 4 |
| Output voltage level: Vout | | | 1 | 1 | 2 | 2 | 3 | 3 | 4 | 4 |

FIG. 4C

| Digital value of the digital data signal DT | | | | | | | | | | |
|---|---|---|---|---|---|---|---|---|---|---|
| D1 | | | 0 | | 0 | | 1 | | 1 | |
| D0 | | | 0 | | 1 | | 0 | | 1 | |
| | Input voltage level | | Voltage level: corresponding voltage level in the case of VA=0 and VB=4 | | | | | | | |
| Differential pair | CP1 | CP2 | CP1 | CP2 | CP1 | CP2 | CP1 | CP2 | CP1 | CP2 |
| First differential pair | V(TL1) | V(TR1) | 4 | 0 | 4 | 0 | 4 | 4 | 4 | 4 |
| Second differential pair | V(TL2) | V(TR2) | 0 | 0 | 4 | 0 | 0 | 4 | 4 | 4 |
| Third differential pair | V(TL3) | V(TR3) | 0 | 4 | 0 | 4 | 4 | 4 | 4 | 4 |
| Fourth differential pair | V(TL4) | V(TR4) | 0 | 0 | 0 | 4 | 4 | 0 | 4 | 4 |
| Output voltage level: Vout | | | 1 | 1 | 2 | 2 | 3 | 3 | 4 | 4 |

FIG. 6

| | Input volta | | Corresponding voltage | |
|---|---|---|---|---|
| Differential pair | CP1 | CP2 | CP1 | CP2 |
| First differential pair | V(TL1) | V(TR1) | V<1> | V<4> |
| Second differential pair | V(TL2) | V(TR2) | V<2> | V<3> |
| Third differential pair | V(TL3) | V(TR3) | V<3> | V<2> |
| Fourth differential pair | V(TL4) | V(TR4) | V<4> | V<1> |

FIG. 8B

| Digital value of the digital data signal DT | | | | | | | | | | |
|---|---|---|---|---|---|---|---|---|---|---|
| D1 | | | 0 | | 0 | | 1 | | 1 | |
| D0 | | | 0 | | 1 | | 0 | | 1 | |
| | Input voltage level | | Voltage level: corresponding voltage level in the case of VA=0 and VB=4 | | | | | | | |
| Differential pair | CP1 | CP2 | CP1 | CP2 | CP1 | CP2 | CP1 | CP2 | CP1 | CP2 |
| First differential pair | V(TL1) | V(TR1) | 4 | 0 | 4 | 0 | 4 | 0 | 4 | 4 |
| Second differential pair | V(TL2) | V(TR2) | 0 | 0 | 4 | 0 | 4 | 4 | 4 | 4 |
| Third differential pair | V(TL3) | V(TR3) | 0 | 0 | 0 | 4 | 4 | 4 | 4 | 4 |
| Fourth differential pair | V(TL4) | V(TR4) | 0 | 4 | 0 | 4 | 0 | 4 | 4 | 4 |
| Output voltage level： Vout | | | 1 | 1 | 2 | 2 | 3 | 3 | 4 | 4 |

FIG. 8C

| Digital value of the digital data signal DT | | | | | | | | | | |
|---|---|---|---|---|---|---|---|---|---|---|
| D1 | | | 0 | | 0 | | 1 | | 1 | |
| D0 | | | 0 | | 1 | | 0 | | 1 | |
| | Input voltage level | | Voltage level: corresponding voltage level in the case of VA=0 and VB=4 | | | | | | | |
| Differential pair | CP1 | CP2 | CP1 | CP2 | CP1 | CP2 | CP1 | CP2 | CP1 | CP2 |
| First differential pair | V(TL1) | V(TR1) | 4 | 0 | 4 | 0 | 4 | 4 | 4 | 4 |
| Second differential pair | V(TL2) | V(TR2) | 0 | 0 | 4 | 0 | 0 | 4 | 4 | 4 |
| Third differential pair | V(TL3) | V(TR3) | 0 | 0 | 0 | 4 | 4 | 0 | 4 | 4 |
| Fourth differential pair | V(TL4) | V(TR4) | 0 | 4 | 0 | 4 | 4 | 4 | 4 | 4 |
| Output voltage level: Vout | | | 1 | 1 | 2 | 2 | 3 | 3 | 4 | 4 |

FIG. 9

| | Input voltage | | Corresponding voltage | |
|---|---|---|---|---|
| Differential pair | CP1 | CP2 | CP1 | CP2 |
| First differential pair | V(TL1) | V(TR1) | V<1> | V<5> |
| Second differential pair | V(TL2) | V(TR2) | V<2> | V<6> |
| Third differential pair | V(TL3) | V(TR3) | V<3> | V<7> |
| Fourth differential pair | V(TL4) | V(TR4) | V<4> | V<8> |
| Fifth differential pair | V(TL5) | V(TR5) | V<5> | V<1> |
| Sixth differential pair | V(TL6) | V(TR6) | V<6> | V<2> |
| Seventh differential pair | V(TL7) | V(TR7) | V<7> | V<3> |
| Eighth differential pair | V(TL8) | V(TR8) | V<8> | V<4> |

FIG. 11A

| Digital value of the digital data signal DT | | | | | | | | | | | | | | | | | | |
|---|---|---|---|---|---|---|---|---|---|---|---|---|---|---|---|---|---|---|
| D2 | | | 0 | | 0 | | 0 | | 0 | | 1 | | 1 | | 1 | | 1 | |
| D1 | | | 0 | | 0 | | 1 | | 1 | | 0 | | 0 | | 1 | | 1 | |
| D0 | | | 0 | | 1 | | 0 | | 1 | | 0 | | 1 | | 0 | | 1 | |
| | Input voltage level | | Voltage level: corresponding voltage level in the case of VA=0 and VB=8 | | | | | | | | | | | | | | | |
| Differential pair | CP1 | CP2 | CP1 | CP2 | CP1 | CP2 | CP1 | CP2 | CP1 | CP2 | CP1 | CP2 | CP1 | CP2 | CP1 | CP2 | CP1 | CP2 |
| First differential pair | V(TL1) | V(TR1) | 8 | 0 | 8 | 0 | 8 | 0 | 8 | 0 | 8 | 8 | 8 | 8 | 8 | 8 | 8 | 8 |
| Second differential pair | V(TL2) | V(TR2) | 0 | 0 | 8 | 0 | 0 | 0 | 8 | 0 | 0 | 8 | 8 | 8 | 0 | 8 | 8 | 8 |
| Third differential pair | V(TL3) | V(TR3) | 0 | 0 | 0 | 0 | 8 | 0 | 8 | 0 | 0 | 8 | 0 | 8 | 8 | 8 | 8 | 8 |
| Fourth differential pair | V(TL4) | V(TR4) | 0 | 0 | 0 | 0 | 8 | 0 | 8 | 0 | 0 | 8 | 0 | 8 | 8 | 8 | 8 | 8 |
| Fifth differential pair | V(TL5) | V(TR5) | 0 | 8 | 0 | 8 | 0 | 8 | 0 | 8 | 8 | 8 | 8 | 8 | 8 | 8 | 8 | 8 |
| Sixth differential pair | V(TL6) | V(TR6) | 0 | 0 | 0 | 8 | 0 | 0 | 0 | 8 | 8 | 0 | 8 | 8 | 8 | 0 | 8 | 8 |
| Seventh differential pair | V(TL7) | V(TR7) | 0 | 0 | 0 | 0 | 0 | 8 | 0 | 8 | 8 | 0 | 8 | 0 | 8 | 8 | 8 | 8 |
| Eighth differential pair | V(TL8) | V(TR8) | 0 | 0 | 0 | 0 | 0 | 8 | 0 | 8 | 8 | 0 | 8 | 0 | 8 | 8 | 8 | 8 |
| Output voltage level: Vout | | | 1 | 1 | 2 | 2 | 3 | 3 | 4 | 4 | 5 | 5 | 6 | 6 | 7 | 7 | 8 | 8 |

FIG. 11B

| | Input voltage | | Corresponding voltage | |
|---|---|---|---|---|
| Differential pair | CP1 | CP2 | CP1 | CP2 |
| First differential pair | V(TL1) | V(TR1) | V<1> | V<8> |
| Second differential pair | V(TL2) | V(TR2) | V<2> | V<7> |
| Third differential pair | V(TL3) | V(TR3) | V<3> | V<6> |
| Fourth differential pair | V(TL4) | V(TR4) | V<4> | V<5> |
| Fifth differential pair | V(TL5) | V(TR5) | V<5> | V<4> |
| Sixth differential pair | V(TL6) | V(TR6) | V<6> | V<3> |
| Seventh differential pair | V(TL7) | V(TR7) | V<7> | V<2> |
| Eighth differential pair | V(TL8) | V(TR8) | V<8> | V<1> |

FIG. 13A

| Digital value of the digital data signal DT | | | | | | | | | | | | | | | | | |
|---|---|---|---|---|---|---|---|---|---|---|---|---|---|---|---|---|---|
| D2 | | | 0 | | 0 | | 0 | | 0 | | 1 | | 1 | | 1 | | 1 |
| D1 | | | 0 | | 0 | | 1 | | 1 | | 0 | | 0 | | 1 | | 1 |
| D0 | | | 0 | | 1 | | 0 | | 1 | | 0 | | 1 | | 0 | | 1 |
| | Input voltage level | | Voltage level: corresponding voltage level in the case of VA=0 and VB=8 | | | | | | | | | | | | | | |
| Differential pair | CP1 | CP2 | CP1 | CP2 | CP1 | CP2 | CP1 | CP2 | CP1 | CP2 | CP1 | CP2 | CP1 | CP2 | CP1 | CP2 | CP1 | CP2 |
| First differential pair | V(TL1) | V(TR1) | 8 | 0 | 8 | 0 | 8 | 0 | 8 | 0 | 8 | 8 | 8 | 8 | 8 | 8 | 8 | 8 |
| Second differential pair | V(TL2) | V(TR2) | 0 | 0 | 8 | 0 | 0 | 0 | 8 | 0 | 0 | 8 | 8 | 8 | 0 | 8 | 8 | 8 |
| Third differential pair | V(TL3) | V(TR3) | 0 | 0 | 0 | 0 | 8 | 0 | 8 | 0 | 0 | 8 | 0 | 8 | 8 | 8 | 8 | 8 |
| Fourth differential pair | V(TL4) | V(TR4) | 0 | 0 | 0 | 0 | 8 | 0 | 8 | 0 | 0 | 8 | 0 | 8 | 8 | 8 | 8 | 8 |
| Fifth differential pair | V(TL5) | V(TR5) | 0 | 0 | 0 | 0 | 0 | 8 | 0 | 8 | 8 | 0 | 8 | 0 | 8 | 8 | 8 | 8 |
| Sixth differential pair | V(TL6) | V(TR6) | 0 | 0 | 0 | 0 | 0 | 8 | 0 | 8 | 8 | 0 | 8 | 0 | 8 | 8 | 8 | 8 |
| Seventh differential pair | V(TL7) | V(TR7) | 0 | 0 | 0 | 8 | 0 | 8 | 0 | 8 | 8 | 0 | 8 | 8 | 8 | 0 | 8 | 8 |
| Eighth differential pair | V(TL8) | V(TR8) | 0 | 8 | 0 | 8 | 0 | 0 | 0 | 8 | 8 | 8 | 8 | 8 | 8 | 8 | 8 | 8 |
| Output voltage level: Vout | | | 1 | 1 | 2 | 2 | 3 | 3 | 4 | 4 | 5 | 5 | 6 | 6 | 7 | 7 | 8 | 8 |

FIG. 13B

| (M-2) bits | | 2 bits | Vout (voltage level) (linear interpolation between VA and VB) |
|---|---|---|---|
| VA (voltage level) | VB (voltage level) | V<1>~V<4> | |
| 0 | 4 | Combination selection of voltage levels (0, 4) | 1~4 |
| 4 | 8 | Combination selection of voltage levels (4, 8) | 5~8 |
| 8 | 12 | Combination selection of voltage levels (8, 12) | 9~12 |
| ... | ... | ... | ... |

FIG. 15A

| (M-3) bits | | 3 bits | Vout (voltage level) (linear interpolation between VA and VB) |
|---|---|---|---|
| VA (voltage level) | VB (voltage level) | V<1>~V<8> | |
| 0 | 8 | 8 combinations of voltage levels (0, 8) | 1~8 |
| 8 | 16 | 8 combinations of voltage levels (8, 16) | 9~16 |
| 16 | 24 | 8 combinations of voltage levels (16, 24) | 17~24 |
| ... | ... | ... | ... |

FIG. 15B

DIGITAL-TO-ANALOG CONVERTER, DATA DRIVER, AND DISPLAY DEVICE

CROSS-REFERENCE TO RELATED APPLICATION

This application claims the priority benefits of Japanese application no. 2023-064830, filed on Apr. 12, 2023. The entirety of the above-mentioned patent application is hereby incorporated by reference herein and made a part of this specification.

BACKGROUND

Technical Field

The disclosure relates to a digital-to-analog converter, a data driver including the digital-to-analog converter, and a display device including the data driver.

Description of Related Art

Currently, liquid crystal display devices or organic EL (Electroluminescence) display devices, etc. are the mainstream active matrix display devices. Such a display device is equipped with a display panel in which multiple data lines and multiple scan lines are wired in an intersecting manner and display cells connected to the multiple data lines via pixel switches are arranged in a matrix, a data driver which supplies an analog voltage signal corresponding to the gradation level to the multiple data lines of the display panel, and a scan driver which supplies a scan signal for controlling on/off of each pixel switch to the multiple scan lines of the display panel. The data driver includes a digital-to-analog conversion part that converts a video digital signal into an analog voltage corresponding to the brightness level and supplies an amplified voltage signal to each data line of the display panel.

A schematic configuration of the data driver will be described hereinafter.

The data driver includes, for example, a shift register, a data register latch, a level shifter, and the digital-to-analog conversion part.

The shift register generates multiple latch timing signals for selecting a latch in synchronization with a clock signal corresponding to a start pulse supplied from a display controller, and supplies the same to the data register latch. The data register latch captures the video digital data supplied from the display controller every predetermined S pieces (S is an integer of 2 or more) based on each of the latch timing signals supplied from the shift register, and supplies S video digital data signals to the level shifter. The level shifter performs level shifting processing to increase the signal amplitude for each of the S video digital data signals supplied from the data register latch, and supplies the obtained S level-shifted video digital data signals to the digital-to-analog conversion part.

The digital-to-analog conversion part includes a reference voltage group generation part, a decoder part, and an amplification part.

The reference voltage group generation part generates multiple reference voltages with voltage values different from each other and supplies the same to the decoder part. For example, the reference voltage group generation part uses multiple divided voltages, obtained by dividing between at least two reference power supply voltages with a ladder resistor, as a reference voltage group and supplies each of the reference voltages of the reference voltage group to the decoder part. In addition, the voltage values of some of the reference voltages in the reference voltage group can be adjusted according to the gamma characteristics of the display device (liquid crystal, organic EL), and supplied to the ladder resistor as the output voltage of a gamma buffer composed of a differential amplifier.

The decoder part has S decoders provided respectively corresponding to each output of the data driver. Each of the decoders is supplied with multiple reference voltages generated by the reference voltage group generation part, and receives the video digital data signal supplied from the level shifter, selects the reference voltage corresponding to this video digital data signal from the multiple reference voltages, and supplies the selected reference voltage to the amplification part.

The amplification part includes S differential amplifiers that individually amplify and output the reference voltage selected by each decoder of the decoder part.

In the digital-to-analog conversion part, for high quality display, the differential amplifier for each output of the amplification part is required to suppress voltage variations between the outputs to be sufficiently small when outputting the same gradation. Further, in a display device using multiple chips, the differential amplifier of the gamma buffer described above is required to suppress voltage variations between the chips to be sufficiently small when outputting the same gradation.

In the differential amplifier, in order to suppress variations in element characteristics caused by semiconductor manufacturing processes or the like, offset cancellation (chopping) driving is known for reducing output variations by averaging positive and negative output variations over time by switching connection.

Furthermore, a differential division amplifier in which multiple differential pairs are connected in parallel is used as such a differential amplifier in order to reduce the area for multiple gradations. For the differential amplifier having multiple differential pairs connected in parallel, there is a method of switching non-inverting/inverting inputs of the differential pairs as an offset cancellation driving method that reduces output variations by switching between at least two states. Besides, a method has also been proposed to switch inputs between multiple differential pairs at the same time as switching non-inverting/inverting inputs.

For example, Patent Document 1 (Japanese Patent Application Laid-Open No. 2006-310959) discloses a configuration for periodically switching between a first state and a second state in a differential amplifier having first and second differential pairs that are two equivalent differential stages, wherein in the first state, one voltage V(T1) of two voltages V(T1) and V(T2) is input to the non-inverting input terminal of the first differential pair, the other voltage V(T2) is input to the non-inverting input terminal of the second differential pair, and the output voltage is input commonly to the inverting input terminals of the first and second differential pairs; and in the second state, one voltage V(T1) is input to the inverting input terminal of the second differential pair, the other voltage V(T2) is input to the inverting input terminal of the first differential pair, and the output voltage is commonly input to the non-inverting input terminals of the first and second differential pairs.

Patent Document 2 (Japanese Patent Application Laid-Open No. 2008-122455) discloses an output circuit that can cancel the mismatch between the inverting input side and the non-inverting input side and the mismatch between the differential pairs with fewer times of switching of connection states for an amplifier having three or more differential pairs, and can save area and reduce voltage variations between the outputs.

However, in the differential amplifier disclosed in Patent Document 1, the switching between the inverting input side and the non-inverting input side and the switching between the differential pairs are performed using two equivalent differential stage configurations that are uniquely determined, which cannot be simply applied to a differential amplifier having $2^M$ (M=2) equivalent differential stages that allows multiple switching.

The differential amplifier disclosed in Patent Document 2 is provided with ($2^M$−1) differential pairs, and the specifications for switching the two input voltages between the first connection state and the second connection state for each differential pair are fixed, so it is not always the optimal method for switching between differential pairs.

The disclosure provides a digital-to-analog converter that includes a differential amplifier including $2^K$ (K is an integer of 2 or more) differential pairs and can effectively perform offset cancellation driving to reduce output variations, a data driver that includes the digital-to-analog converter, and a display device that includes the data driver.

SUMMARY

A digital-to-analog converter of the disclosure includes: a first decoder that receives a K-bit (K is a positive number of 2 or more) digital data signal, a first voltage, and a second voltage at a different voltage level from the first voltage, and generates $2^K$ voltages each indicating the first voltage or the second voltage according to the digital data signal; and a differential amplifier that outputs an output voltage having one of $2^K$ voltage levels obtained by dividing a voltage between the first voltage and the second voltage into $2^K$ voltage levels according to the $2^K$ voltages. The differential amplifier includes: $2^K$ differential pairs each including first and second differential input terminals and first and second differential output terminals, in which the first differential output terminals are connected to a first node, and the second differential output terminals are connected to a second node; an amplification stage including a non-inverting input terminal and an inverting input terminal, in which the non-inverting input terminal is connected to the first node and the inverting input terminal is connected to the second node in a first state, the non-inverting input terminal is connected to the second node and the inverting input terminal is connected to the first node in a second state, and the amplification stage outputs the output voltage according to input voltages respectively to the non-inverting input terminal and the inverting input terminal; and a multiplexer including $2^K$ input terminals that receive the $2^K$ voltages from the first decoder, in which, in the first state, the multiplexer supplies voltages of the input terminals of one of two groups which are obtained by dividing the $2^K$ input terminals into two groups of the same number of input terminals respectively to the first differential input terminals of the differential pairs of one of two groups which are obtained by dividing the $2^K$ differential pairs into two groups of the same number of differential pairs, supplies voltages of the input terminals of the other of the two groups of input terminals respectively to the first differential input terminals of the differential pairs of the other of the two groups of differential pairs, and supplies the output voltage to the second differential input terminals of all of the $2^K$ differential pairs, and in the second state, the multiplexer supplies the voltages of the input terminals of one group respectively to the second differential input terminals of the differential pairs of the other group, supplies the voltages of the input terminals of the other group respectively to the second differential input terminals of the differential pairs of one group, and supplies the output voltage to the first differential input terminals of all of the $2^K$ differential pairs.

A data driver of the disclosure includes: a plurality of the digital-to-analog converters, in which the data driver converts each of video digital data pieces representing a brightness level of each pixel as a digital value into a plurality of the output voltages each having an analog voltage level by the plurality of digital-to-analog converters, and respectively supplies a plurality of drive signals each having the plurality of output voltages to a plurality of data lines of a display panel.

A display device of the disclosure includes: a display panel including a plurality of data lines to which a plurality of display cells are respectively connected; and a data driver including a plurality of the digital-to-analog converters, converting each of video digital data pieces representing a brightness level of each pixel as a digital value into a plurality of the output voltages each having an analog voltage level by the plurality of digital-to-analog converters, and respectively supplying a plurality of drive signals each having the plurality of output voltages to the plurality of data lines of the display panel.

BRIEF DESCRIPTION OF THE DRAWINGS

FIG. 4B is a diagram showing the correspondence relationship in voltage level between the input voltages to the first to fourth differential pairs and the voltages V<1> to V<4> in the first and second states in the case of the MUX of FIG. 3.

FIG. 4C is a diagram showing the input voltage levels to the differential pairs in the first and second states in the case where the voltage levels are VA=0 and VB=4 in the correspondence relationship of FIG. 4B.

FIG. 6 is a diagram showing another example of the input voltage levels to the differential pairs in the first and second states in the case where the voltage levels are VA=0 and VB=4.

FIG. 8B is a diagram showing the correspondence relationship in voltage level between the input voltages to the first to fourth differential pairs and the voltages V<1> to V<4> in the first and second states in the case of the MUX of FIG. 7.

FIG. 8C is a diagram showing the input voltage levels to the first to fourth differential pairs in the first and second states in the case where the voltage levels are VA=0 and VB=4 in the correspondence relationship of FIG. 4B.

FIG. 9 is a diagram showing another example of the input voltage levels to the differential pairs in the first and second states in the case where the voltage levels are VA=0 and VB=4.

FIG. 11A is a diagram showing the correspondence relationship in voltage level between the input voltages to the first to eighth differential pairs and the voltages V<1> to V<8> in the first and second states in the case of the MUX of FIG. 10.

FIG. 11B is a diagram showing the input voltage levels to the first to eighth differential pairs in the first and second states in the case where the voltage levels are VA=0 and VB=8 in the correspondence relationship of FIG. 11A.

FIG. 13A is a diagram showing another example of the correspondence relationship in voltage level between the input voltages to the first to eighth differential pairs and the voltages V<1> to V<8> in the first and second states.

FIG. 13B is a diagram showing the input voltage levels to the first to eighth differential pairs in the first and second states in the case where the voltage levels are VA=0 and VB=8 in the correspondence relationship of FIG. 11A.

FIG. 15A is a diagram showing the correspondence relationship in voltage level between the selected voltages of VA and VB by the upper (M-K) bits and the output voltage Vout in the case of K=2.

FIG. 15B is a diagram showing the correspondence relationship in voltage level between the selected voltages of VA and VB by the upper (M-K) bits and the output voltage Vout in the case of K=3.

DESCRIPTION OF THE EMBODIMENTS

Embodiments of the disclosure will be described in detail hereinafter with reference to the drawings.

Since the digital-to-analog converter, the data driver, and the display device of the disclosure actively create the situation of keeping the relationship in which the input voltage from the multiplexer to the first differential input terminal in the first state and the input voltage from the multiplexer to the second differential input terminal in the subsequent second state are different from each other in each of the $2^K$ differential pairs, offset cancellation driving can be effectively performed, thereby reducing output variations.

First Embodiment

Figure 1:
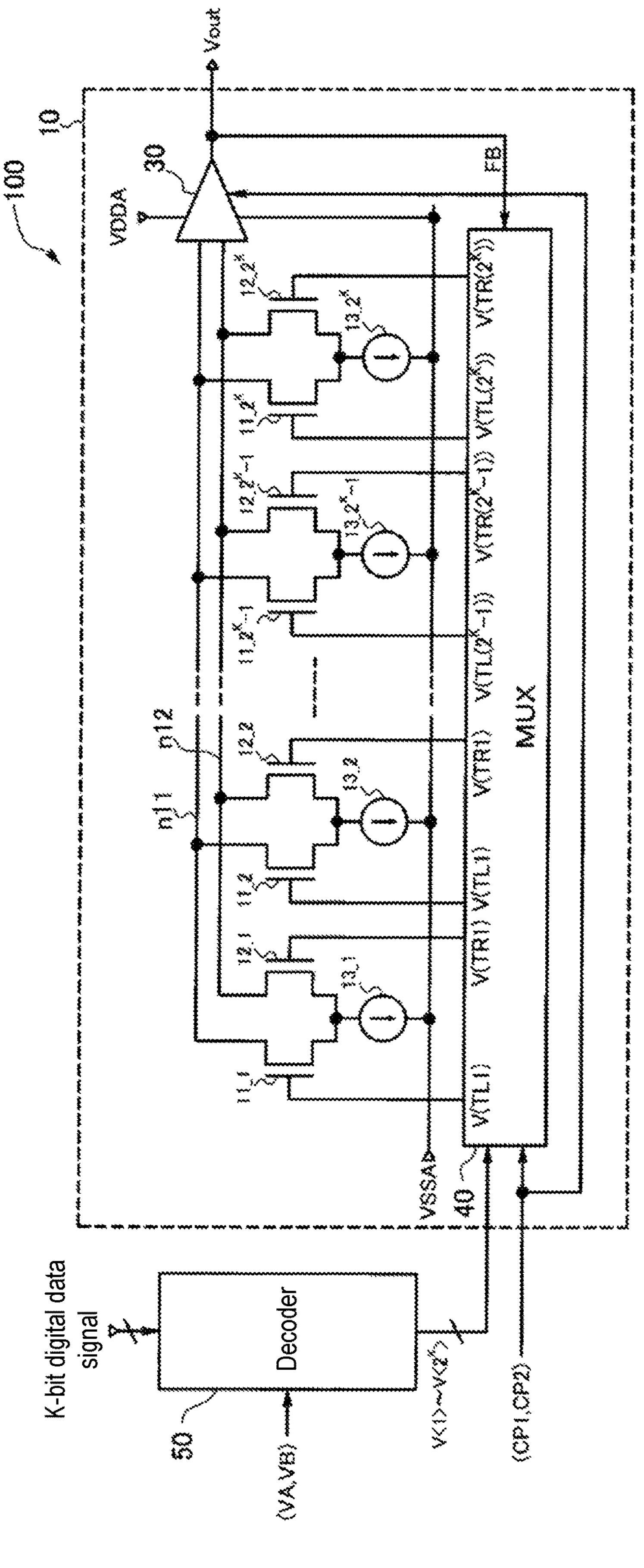
FIG. 1 is a circuit diagram showing the configuration of the digital-to-analog converter according to the disclosure.

FIG. 1 shows the schematic configuration of a digital-to-analog converter according to the disclosure. In FIG. 1, this digital-to-analog converter is indicated by reference numeral 100. The digital-to-analog converter 100 includes a decoder 50 and a differential amplifier 10 including $2^K$ (K is an integer of 2 or more) differential pairs of the same conductivity type, and converts a K-bit digital data signal DT into an output voltage Vout having an analog voltage level.

The decoder 50 receives the digital data signal DT and two voltages VA and VB having different voltage values. The digital value (D1, D0 in the case of K=2) indicated by the digital data signal DT can change at a predetermined sampling cycle (one data period). Based on the digital value of the digital data signal DT, the decoder 50 generates combination voltages V<1> to V<$2^K$> composed of $2^K$ voltages using the voltages VA and VB, and supplies the generated voltages V<1> to V<$2^K$> to the differential amplifier 10. For example, in the case of K=2, the decoder 50 generates four selected voltages V<1> to V<4> using the voltages VA and VB from the digital value (D1, D0). Further, in the case of K=3, eight selected voltages V<1> to V<8> are generated using the voltages VA and VB from the digital value (D2, D1, D0).

The differential amplifier 10 is connected to the decoder 50, and amplifies the voltage level that is the average value of the $2^K$ voltages V<1> to V<$2^K$> supplied from the decoder 50 and outputs the amplification result as the output voltage signal Vout. That is, in the case of receiving $2^K$ voltages V<1> to V<$2^K$>, the output voltage Vout is:

$$V_{out} = \left(V{<}1{>} + V{<}2{>} + \ldots + V{<}2^K{>}\right)/2^K. \quad (1)$$

In addition, since one of the voltage VA and the voltage VB is selected as each of the voltages V<1> to V<$2^K$>, the output voltage Vout in the above equation (1) is also a weighted average voltage that divides the voltages VA and VB at a predetermined ratio. Therefore, based on the digital value of the K-bit digital data signal DT, $2^K$ combinations of the voltages V<1> to V<2> appropriately selected from the voltage VA or VB are supplied from the decoder 50 to the differential amplifier 10, thereby making it possible to extract $2^K$ voltage levels obtained by dividing the voltage between the voltages VA and VB into $2^K$ as the output voltage Vout.

Figure 2:
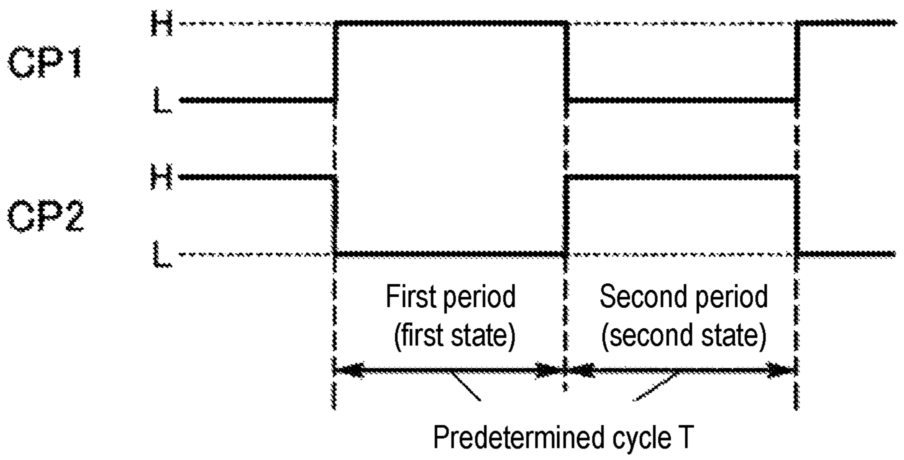
FIG. 2 is a diagram showing the relationship between the first period in the first state and the second period in the second state in the digital-to-analog converter of FIG. 1.

The differential amplifier 10 includes $2^K$ first to $2^K$-th differential pairs (11_1, 12_1) to (11_$2^K$, 12_$2^K$) of the same conductivity type, current sources 13-1 to 13-$2^K$, an amplification stage 30, and a MUX (multiplexer) 40. In addition to the 2K voltages V<1> to V<$2^K$> supplied from the decoder 50, the differential amplifier 10 is supplied with control signals CP1 and CP2 as input signals. For example, as shown in FIG. 2, the control signal CP1 is generated to have high level H in a first period and low level Lin a second period, and the control signal CP2 is generated to have high level H in the second period and low level L in the first period. The first period and the second period have the same time length, and are repeated at a predetermined cycle such as a frame cycle for updating one screen worth of display data on the display panel, for example. The digital values D1 and D0 are the same in the first period and the second period.

The differential amplifier 10 has two connection states, which will be described later, and the control signals CP1 and CP2 are signals supplied to the amplification stage 30 and the MUX 40 in order to select one of the two connection states. A first state occurs in the first period controlled by the control signal CP1, and a second state occurs in the second period controlled by the control signal CP2.

Each of the differential pairs (11_1, 12_1) to (11_$2^K$, 12_$2^K$) is constituted by two N-channel type transistors 11_1, 12_1 to 11_$2^K$, 12_$2^K$. The drain of one N-channel type transistor 11_1 of the differential pair (11_1, 12_1) is connected to a node n11, and the drain of the other N-channel type transistor 12_1 is connected to a node n12. The sources of the transistors 11_1 and 12_1 are commonly connected and also connected to the supply line of the low potential power supply voltage VSSA via the current source 13-1. The gates of the transistors 11_1 and 12_1, which are the non-inverting input terminals or inverting input terminals of the differential pair (11_1, 12_1), are individually connected to the MUX 40. The second to $2^K$-th differential pairs (11_2, 12_2) to (11_$2^K$, 12_$2^K$) are also connected in the same manner as the first differential pair (11_1, 12_1).

In addition, the gates of the transistors 11_1 to 11_$2^K$ constituting the differential pairs (11_1, 12_1) to (11_$2^K$, 12_$2^K$) are the first differential input terminals, and the gates of the other transistors 12_1 to 12_$2^K$ are the second differential input terminals. Further, the drains of the transistors 11_1 to 11_$2^K$ are the first differential output terminals, and the drains of the other transistors 12_1 to 12_$2^K$ are the second differential output terminals.

Hereinafter, the operation will be described assuming that the differential pair transistors constituting each of the differential pairs (11_1, 12_1) to (11_$2^K$, 12_$2^K$) have equivalent characteristics. In other words, in an actual configuration, for example, there are cases where multiple differential pairs with common input are replaced with one differential pair in which the size of the differential pair transistors is changed, but for convenience, it is assumed that the characteristics of the differential pair transistors of each differential pair are the same, and the disclosure includes an equivalent configuration. As the simplest example, the differential pair transistors of the differential pairs (11_1, 12_1) to (11_$2^K$, 12_$2^K$) all have the same size.

Furthermore, P-channel type differential pairs or dual-conductivity type differential pairs composed of an N-channel type transistor and a P-channel type transistor may be used in place of the N-channel type differential pairs shown in FIG. 1 to serve as the differential pairs (11_1, 12_1) to (11_$2^K$, 12_$2^K$) included in the differential amplifier 10.

The amplification stage 30 is composed of a differential amplifier having two input terminals, one of which is connected to the node n11 and the other of which is connected to the node n12. The high potential power supply voltage VDDA and the low potential power supply voltage VSSA are applied to the amplification stage 30. Furthermore, as described above, the amplification stage 30 is supplied with the control signals CP1 and CP2. In the first state controlled by the control signal CP1, one input terminal connected to the node n11 becomes a non-inverting input terminal (+), and the other input terminal connected to the node n12 becomes an inverting input terminal (−). In the second state controlled by the control signal CP2, one input terminal connected to the node n11 becomes an inverting input terminal (−), and the other input terminal connected to the node n12 becomes a non-inverting input terminal (+). Thus, in each of the first and second states, the amplification stage 30 performs an amplification operation with the non-inverting input terminal (+) and the inverting input terminal (−) reversed, and generates the output voltage Vout. The output voltage Vout is supplied to the MUX 40 as a feedback voltage FB.

The MUX 40 is connected to the gates of the two N-channel type transistors 11_1, 12_1 to 11_$2^K$, 12_$2^K$ of each of the differential pairs (11_1, 12_1) to (11_$2^K$, 12_$2^K$). The MUX 40 receives the $2^K$ voltages V<1> to V<2> supplied from the decoder 50. Further, as described above, the MUX 40 is supplied with the control signals CP1 and CP2.

The MUX 40 supplies one of the voltages V<1> to V<$2^K$> or the feedback voltage FB to the gates of the transistors 11_1, 12_1 to 11_$2^K$, 12_$2^K$ in accordance with the control signals CP1 and CP2. From the MUX 40, voltages V(TL1) to V(TL2$^K$) are supplied to the gates of the transistors 11_1 to 11_$2^K$ of the differential pairs (11_1, 12_1) to (11_$2^K$, 12_$2^K$), and voltages V(TR1) to V(TR2$^K$) are supplied to the gates of the other transistors 12_1 to 12_$2^K$. In the first state controlled by the control signal CP1, each of the voltages V(TL1) to V(TL2$^K$) becomes one of the voltages V<1> to V<$2^K$>, and each of the voltages V(TR1) to V(TR2$^K$) becomes the feedback voltage FB. In the second state controlled by the control signal CP2, each of the voltages V(TL1) to V(TL2$^K$) becomes the feedback voltage FB, and each of the voltages V(TR1) to V(TR2$^K$) becomes one of the voltages V<1> to V<2>.

In addition, in the MUX 40, the $2^K$ voltages V<1> to V<$2^K$> supplied from the decoder 50 and the $2^K$ differential pairs (11_1, 12_1) to (11_$2^K$, 12_$2^K$) are respectively divided into two groups of the same number. Then, in the first state controlled by the control signal CP1, the voltages of one group of the voltages V<1> to V<$2^K$> divided into two groups are respectively supplied to the first differential input terminals of one group of the differential pairs divided into two groups, among the first differential input terminals (the gates of the transistors 11_1 to 11_$2^K$) of the $2^K$ differential pairs; and the voltages of the other group of the voltages V<1> to V<$2^K$> divided into two groups are respectively supplied to the first differential input terminals of the other group of the differential pairs divided into two groups, among the first differential input terminals (the gates of the transistors 11_1 to 11_$2^K$) of the $2^K$ differential pairs. Further, in the first state, the feedback voltage FB is supplied to all the second differential input terminals (the gates of the transistors 12_1 to 12_$2^K$) of the $2^K$ differential pairs. In the second state controlled by the control signal CP2, the voltages of one group of the voltages V<1> to V<$2^K$> divided into two groups are respectively supplied to the second differential input terminals of the other group of the differential pairs divided into two groups, among the second differential input terminals (the gates of the transistors 12_1 to 12_$2^K$) of the $2^K$ differential pairs; and the voltages of the other group of the voltages V<1> to V<2"> divided into two groups are respectively supplied to the second differential input terminals of one group of the differential pairs divided into two groups, among the second differential input terminals (the gates of the transistors 11_1 to 11_$2^K$) of the $2^K$ differential pairs. Further, in the second state, the feedback voltage FB is supplied to all the first differential input terminals (the gates of the transistors 11_1 to 11_$2^K$) of the $2^K$ differential pairs. That is, in the first state and the second state, the voltages V<1> to V<2"> of the same number are not supplied to each differential pair. For example, in the case where the voltage V<1> of one of the two groups is supplied as the voltage V(TL1) to the gate of the transistor 11_1 of the first differential pair (11_1, 12_1) belonging to one of the two groups in the first state, a voltage of the other of the two groups other than the voltage V<1> is supplied as the voltage V(TR1) to the gate of the transistor 12_1 of the differential pair (11_1, 12_1) in the second state. This also applies to the other second to $2^K$-th differential pairs (11_2, 12_2) to (11_$2^K$, 12_$2^K$).

Then, by providing the first period and the second period for switching at a predetermined cycle, and performing time averaging with the first state in the first period and the second state in the second period, an offset voltage occurring in the output voltage Vout due to variations in the differential pairs can be canceled.

Figure 3:
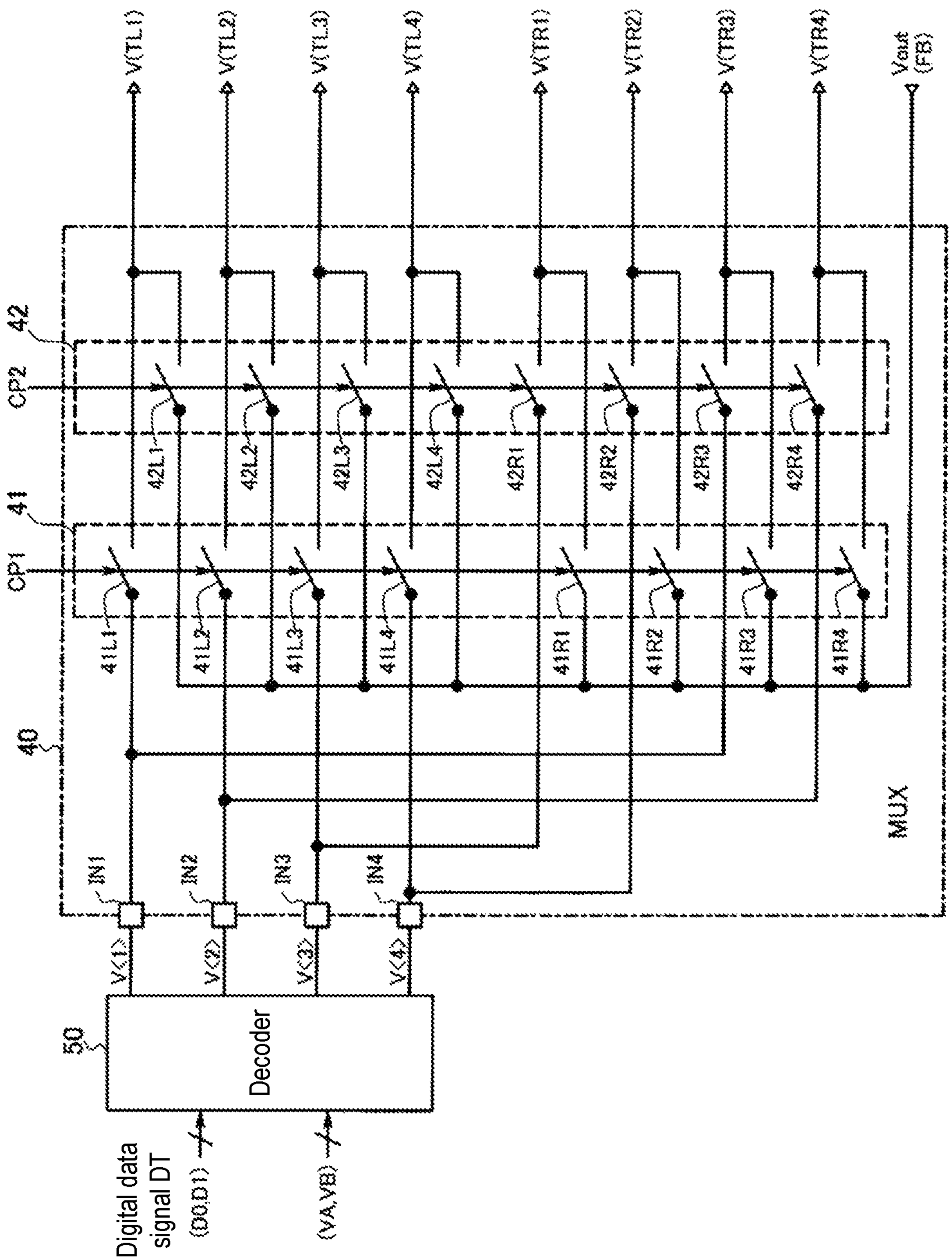
FIG. 3 is a circuit diagram showing the configuration of the multiplexer (MUX) in the digital-to-analog converter of FIG. 1 in the case of K=2.

FIG. 3 shows an example of the internal configuration of the MUX 40 in the case of K=2 in the differential amplifier 10 of the digital-to-analog converter 100 having such a configuration.

In FIG. 3, the MUX 40 has four input terminals IN1 to IN4 (first input terminal to fourth input terminal) that individually receive the voltages V<1> to V<4> supplied from the decoder 50. Further, the MUX 40 has two switch groups 41 and 42. The switches 41L1 to 41L4 and 41R1 to 41R4 constituting the switch group 41 are turned on in the first period and turned off in the second period in response to the control signal CP1. The switches 42L1 to 42L4 and 42R1 to 42R4 constituting the switch group 42 are turned on in the second period and turned off in the first period in response to the control signal CP2.

When the switch group 41 is turned on, the voltages V<1> to V<4> supplied from the decoder 50 to the input terminals IN1 to IN4 are output as the voltages V(TL1) to V(TL4) via the switches 41L1 to 41L4, and the feedback voltage FB, which is the output voltage Vout, is output as the voltages V(TR1) to V(TR4) via the switches 41R1 to 41R4. On the other hand, when the switch group 42 is turned on, the voltage V<1> among the voltages V<1> to V<4> supplied from the decoder 50 is output as the voltage V(TR3) via 42R3, the voltage V<2> is output as the voltage V(TR4) via 42R4, the voltage V<3> is output as the voltage V(TR1) via 42R1, the voltage V<4> is output as the voltage V(TR2) via 42R2, and the feedback voltage FB is output as the voltages V(TL1) to V(TL4) via the switches 42L1 to 42L4.

Next, the first and second states in the case of the MUX 40 having the internal configuration shown in FIG. 3 will be described.

In the first state, the switch group 41 is turned on, the switch group 42 is turned off, the voltages V<1> and V<2> of the input terminals IN1 and IN2 of one group among the input terminals IN1 to IN4 of the MUX 40 are respectively supplied to the gates (first differential input terminals) of the transistors 11_1 and 11_2 of the first and second differential pairs (11_1, 12_1) and (11_2, 12_2) which are the differential pairs of one group among the first to fourth differential pairs (11_1, 12_1) to (11_4, 12_4), the voltages V<3> and V<4> of the input terminals IN3 and IN4 of the other group are respectively supplied to the gates (first differential input terminals) of the transistors 11_3 and 11_4 of the third and fourth differential pairs (11_3, 12_3) and (11_4, 12_4) which are the differential pairs of the other group, and the feedback voltage FB which is the output voltage Vout is respectively supplied to the gates (second differential input terminals) of the transistors 12_1 to 12_4 of the first to fourth differential pairs (11_1, 12_1) to (11_4, 12_4).

In the second state, the switch group 41 is turned off, the switch group 42 is turned on, the voltages V<1> and V<2> of the input terminals IN1 and IN2 of one group are respectively supplied to the gates (second differential input terminals) of the transistors 12_3 to 12_4 of the third and fourth differential pairs (11_3, 12_3) and (11_4, 12_4) which are the differential pairs of the other group, the voltages V<3> and V<4> of the input terminals IN3 and IN4 of the other group are respectively supplied to the gates (second differential input terminals) of the transistors 12_1 to 12_2 of the first and second differential pairs (11_1, 12_1) and (11_2, 12_2) which are the differential pairs of one group, and the feedback voltage FB is respectively supplied to the gates (first differential input terminals) of the transistors 11_1 to 11_4 of the first to fourth differential pairs (11_1, 12_1) to (11_4, 12_4).

Figure 4A:
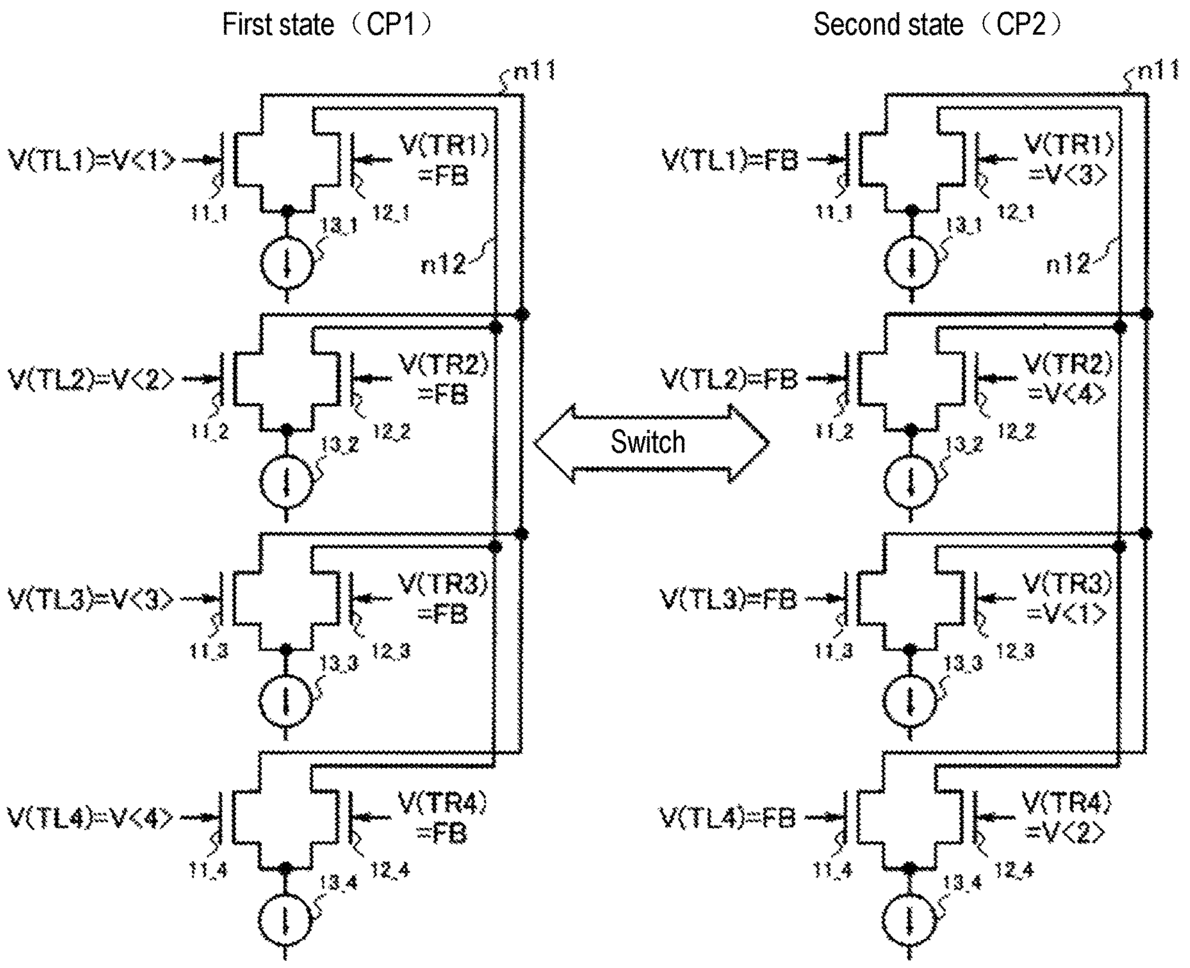
FIG. 4A is a diagram showing the input voltages to the first to fourth differential pairs in the first and second states in the case of the MUX of FIG. 3.

Specifically, as shown in FIG. 4A, in the first state (CP1), the voltage V<1> is supplied as the voltage V(TL1) to the gate of the transistor 11_1 of the first differential pair (11_1, 12_1), the voltage V<2> is supplied as the voltage V(TL2) to the gate of the transistor 11_2 of the second differential pair (11_2, 12_2), the voltage V<3> is supplied as the voltage V(TL3) to the gate of the transistor 11_3 of the third differential pair (11_3, 12_3), and the voltage V<4> is supplied as the voltage V(TL4) to the gate of the transistor 11_4 of the fourth differential pair (11_4, 12_4). At the same time, the feedback voltage FB is supplied as the voltages V(TR1) to V(TR4) to the gates of the transistors 12_1 to 12_4 of the first to fourth differential pairs (11_1, 12_1) to (11_4, 12_4).

The first state occurs during the first period. The second state occurs during the second period after the first period has elapsed. In the second state (CP2), the feedback voltage FB is supplied as the voltages V(TL1) to V(TL4) to the gates of the transistors 11_1 to 11_4 of the first to fourth differential pairs (11_1, 12_1) to (11_4, 12_4). At the same time, the voltage V<3> is supplied as the voltage V(TR1) to the gate of the transistor 12_1 of the first differential pair (11_1, 12_1), the voltage V<4> is supplied as the voltage V(TR2) to the gate of the transistor 12_2 of the second differential pair (11_2, 12_2), the voltage V<1> is supplied as the voltage V(TR3) to the gate of the transistor 12_3 of the third differential pair (11_3, 12_3), and the voltage V<2> is supplied as the voltage V(TR4) to the gate of the transistor 12_4 of the fourth differential pair (11_4, 12_4).

FIG. 4B shows the correspondence relationship between the voltages V(TL1) to V(TL4) in the first state (CP1) and the voltages V(TR1) to V(TR4) in the second state (CP2), which are the input voltages of the first to fourth differential pairs (11_1, 12_1) to (11_4, 12_4), and the voltages V<1> to V<4>. In addition, in FIG. 4B, in order to show the tendency of the characteristics of the digital-to-analog converter of the disclosure, the voltages V<1> to V<4> are shown using relative voltage levels rather than specific voltage values.

Here, in the case where the voltage levels of the voltages VA and VB are VA=0 and VB=4, voltage level 0 or 4 is assigned to each of the voltages V<1> to V<4>. Since the digital value (D1, D0) indicated by the digital data signal DT shows four values, (0, 0), (0, 1), (1, 0), and (1, 1), for each of the four values, voltage level 0 or 4 is set to the voltages V(TL1) to V(TL4) in the first state and the voltages V(TR1) to V(TR4) in the second state.

The voltage levels of the selected voltages of the decoder 50 when the digital value (D1, D0) is (0, 0) become V<1>=4 and V<2>=V<3>=V<4>=0, the voltage levels of the selected voltages of the decoder 50 when the digital value (D1, DO) is (0, 1) become V<1>=V<2>=4 and V<3>=V<4>=0, the voltage levels of the selected voltages of the decoder 50 when the digital value (D1, D0) is (1, 0) become V<1>=V<2>=V<3>=4 and V<4>=0, and the voltage levels of the selected voltages of the decoder 50 when the digital value (D1, D0) is (1, 1) become V<1>=V<2>=V<3>=V<4>=4.

As shown in FIG. 4C, in the first state (CP1) when the digital value (D1, D0 is (0, 0), V(TL1) at voltage level 4 is supplied to the gate of the transistor 11_1 of the first differential pair (11_1, 12_1), and V(TL2) to V(TL4) at voltage level 0 are respectively supplied to the gates of the transistors 11_2 to 11_4 of the second to fourth differential pairs (11_2, 12_2) to (11_4, 12_4). In the second state (CP2) when the digital value (D1, D0) is (0, 0), V(TR3) at voltage level 4 is supplied to the gate of the transistor 12_3 of the third differential pair (11_3, 12_3), and V(TR1), V(TR2), and V(TR4) at voltage level 0 are supplied to the gates of the transistors 12_1, 12_2, and 12_4 of the first, second, and fourth differential pairs (11_1, 12_1), (11_2, 12_2), and (11_4, 12_4). In the first and second states, the output voltage Vout is at voltage level 1.

In the first state (CP1) when the digital value (D1, D0) is (0, 1), V(TL1) and V(TL2) at voltage level 4 are respectively supplied to the gates of the transistors 11_1 and 11_2 of the first and second differential pairs (11_1, 12_1) and (11_2, 12_2), and V(TL3) and V(TL4) at voltage level 0 are supplied to the gates of the transistors 11_3 and 11_4 of the third and fourth differential pairs (11_3, 12_3) and (11_4, 12_4). In the second state (CP2) when the digital value (D1, D0) is (0, 1), V(TR1) and V(TR2) at voltage level 0 are respectively supplied to the gates of the transistors 12_1 and 12_2 of the first and second differential pairs (11_1, 12_1) and (11_2, 12_2), and V(TR3) and V(TR4) at voltage level 4 are respectively supplied to the gates of the transistors 12_3 and 12_4 of the third and fourth differential pairs (11_3, 12_3) and (11_4, 12_4). In the first and second states, the output voltage Vout is at voltage level 2.

In the first state (CP1) when the digital value (D1, D0) is (1, 0), V(TL1) to V(TL3) at voltage level 4 are respectively supplied to the gates of the transistors 11_1 to 11_3 of the first to third differential pairs (11_1, 12_1) to (11_3, 12_3), and V(TL4) at voltage level 0 is supplied to the gate of the transistor 11_4 of the fourth differential pair (11_4, 12_4). In the second state (CP2) when the digital value (D1, D0) is (1, 0), V(TR1), V(TR3), and V(TR4) at voltage level 4 are respectively supplied to the gates of the transistors 12_1, 12_3, and 12_4 of the first, third, and fourth differential pairs (11_1, 12_1), (11_3, 12_3), and (11_4, 12_4), and V(TR2) at voltage level 0 is supplied to the gate of the transistor 12_2 of the second differential pair (11_2, 12_2). In the first and second states, the output voltage Vout is at voltage level 3.

In the first state (CP1) when the digital value (D1, DO) is (1, 1), V(TL1) to V(TL4) at voltage level 4 are respectively supplied to the gates of the transistors 11_1 to 11_4 of the first to fourth differential pairs (11_1, 12_1) to (11_4, 12_4). In the second state (CP2) when the digital value (D1, DO) is (1, 1), V(TR1) to V(TR4) at voltage level 4 are respectively supplied to the gates of the transistors 12_1 to 12_4 of the first to fourth differential pairs (11_1, 12_1) to (11_4, 12_4). In the first and second states, the output voltage Vout is at voltage level 4.

In each of the first to fourth differential pairs (11_1, 12_1) to (11_4, 12_4) of the first embodiment, the situation of keeping the relationship in which the input voltage from the MUX 40 to the gate of one transistor in the first state (first period) and the input voltage from the MUX 40 to the gate of the other transistor in the subsequent second state (second period) are different from each other is actively created. As the mutually different voltage relationship, specifically, if the input voltage level from the MUX 40 to the gate of one transistor of the differential pair in the first state (first period) is 0, the input voltage level from the MUX 40 to the gate of the other transistor of the differential pair in the second state (second period) becomes 4; conversely, if the input voltage level from the MUX 40 to the gate of one transistor of the differential pair in the first state (first period) is 4, the input voltage level from the MUX 40 to the gate of the other transistor of the differential pair in the second state (second period) becomes 0. As can be seen from FIG. 4C, the mutually different voltage relationship occurs in two differential pairs in the case where the digital value (D1, D0) is (0, 0) and (1, 0), and occurs in four differential pairs in the case where the digital value (D1, D0) is (0, 1).

Figure 5:
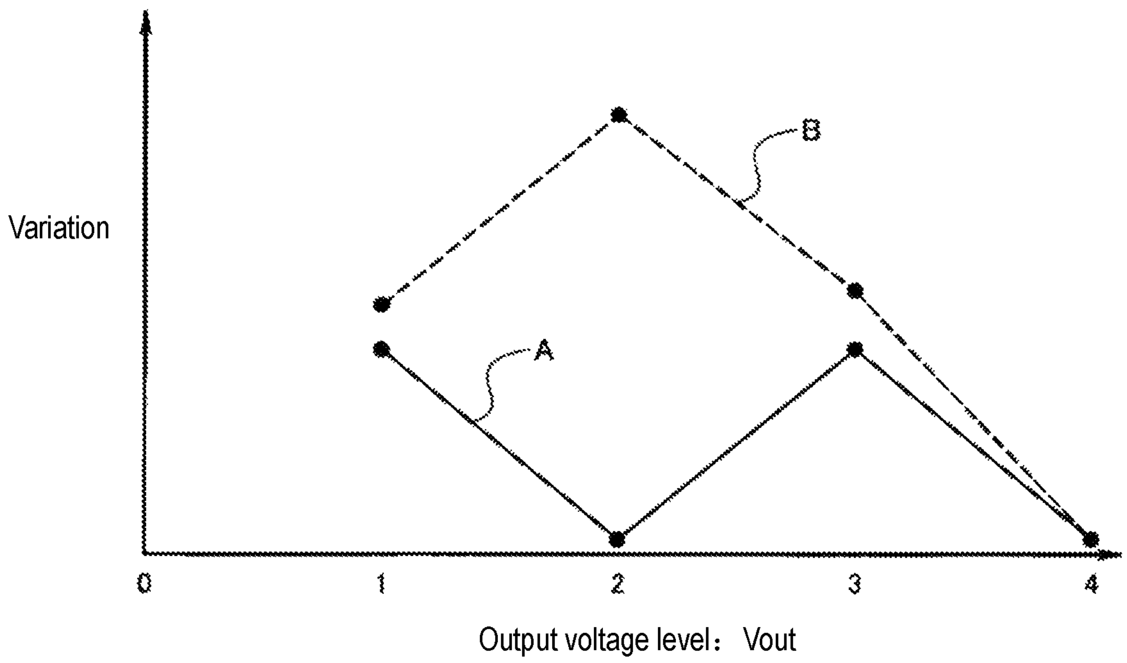
FIG. 5 is a diagram showing the characteristics as a result of estimating variations in output voltage by Monte Carlo simulation in the case where the voltage levels are VA=0 and VB=4.

The characteristics shown by the solid line A in FIG. 5 were obtained by estimating by Monte Carlo simulation the output variations of each of voltage levels 1, 2, 3, and 4 of the output voltage Vout in the case where the voltage levels of the voltages VA and VB are set to VA=0 and VB=4 described above. The broken line B in FIG. 5 shows the characteristics to be compared with the characteristics shown by the solid line A. The characteristics shown by the broken line B are the output variations in the case of the related art in which the input signal is switched between the first state (first period) and the second state (second period) between the gates of two transistors for each differential pair. Upon comparison of the two characteristics, the first embodiment was able to reduce output variations at voltage levels 1, 2, and 3 of the output voltage Vout corresponding to the case where the digital value (D1, D0) is (0, 0), (1, 0), and (0, 1). In particular, it was found that the effect of reducing output variations is large in the case where the output voltage Vout is at voltage level 2 between the voltages VA and VB where the mutually different voltage relationship described above occurs in all differential pairs. According to the result of this Monte Carlo simulation, it is considered that the digital-to-analog converter 100 of the first embodiment can perform highly accurate offset cancellation.

In addition, in the first embodiment, if the voltage levels of the selected voltages of the decoder 50 when the digital value (D1, D0) is (1, 0) are set to V<1>=V<3>=V<4>=4 and V<2>=0, the voltage values of the voltages V(TL1) to V(TL4) and V(TR1) to V(TR4) supplied to each differential pair in the first and second states for each digital value are as shown in FIG. 6. In FIG. 6, the supply voltages of the voltages V(TL1) to V(TL4) and V(TR1) to V(TR4) when the digital value (D1, D0) is (1, 0) are different from the case shown in FIG. 4C. That is, in the first state (CP1), V(TL1), V(TL3), and V(TL4) at voltage level 4 are respectively supplied to the gates of the transistors 11_1, 11_3, and 11_4 of the first, third, and fourth differential pairs (11_1, 12_1), (11_3, 12_3), and (11_4, 12_4), and V(TL2) at voltage level 0 is supplied to the gate of the transistor 11_2 of the second differential pair (11_2, 12_2). On the other hand, in the second state (CP2) when the digital value (D1, D0) is (1, 0), V(TR1) to V(TR3) at voltage level 4 are respectively supplied to the gates of the transistors 12_1 to 12_3 of the first to third differential pairs (11_1, 12_1) to (11_3, 12_3), and V(TR4) at voltage level 0 is supplied to the gate of the transistor 12_4 of the fourth differential pair (11_4, 12_4). In the first and second states, the output voltage Vout is at voltage level 3.

In addition, although FIG. 4C of the first embodiment illustrates an example of specifications in which the digital value (D1, D0) is assigned to four voltage levels 1 to 4 up to the voltage VB excluding the voltage VA (voltage level 0) among the voltage levels obtained by dividing the voltage between the voltages VA and VB into four, it is also possible to replace the specifications by assigning (0, 0) to (1, 1) of the digital value (D1, D0) to four voltage levels 0 to 3 that include the voltage VA and exclude the voltage VB. In that case, the characteristics of output variations at output voltage level 0 in FIG. 5 are equivalent to the characteristics at output voltage level 4. Since the above specification changes are easy to make, details will be omitted. Therefore, in each of the following embodiments, an example of specifications in which a K-bit digital value is assigned to $2^K$ output voltage levels 1 to $2^K$ up to the voltage VB excluding the voltage VA will be described.

Second Embodiment

Figure 7:
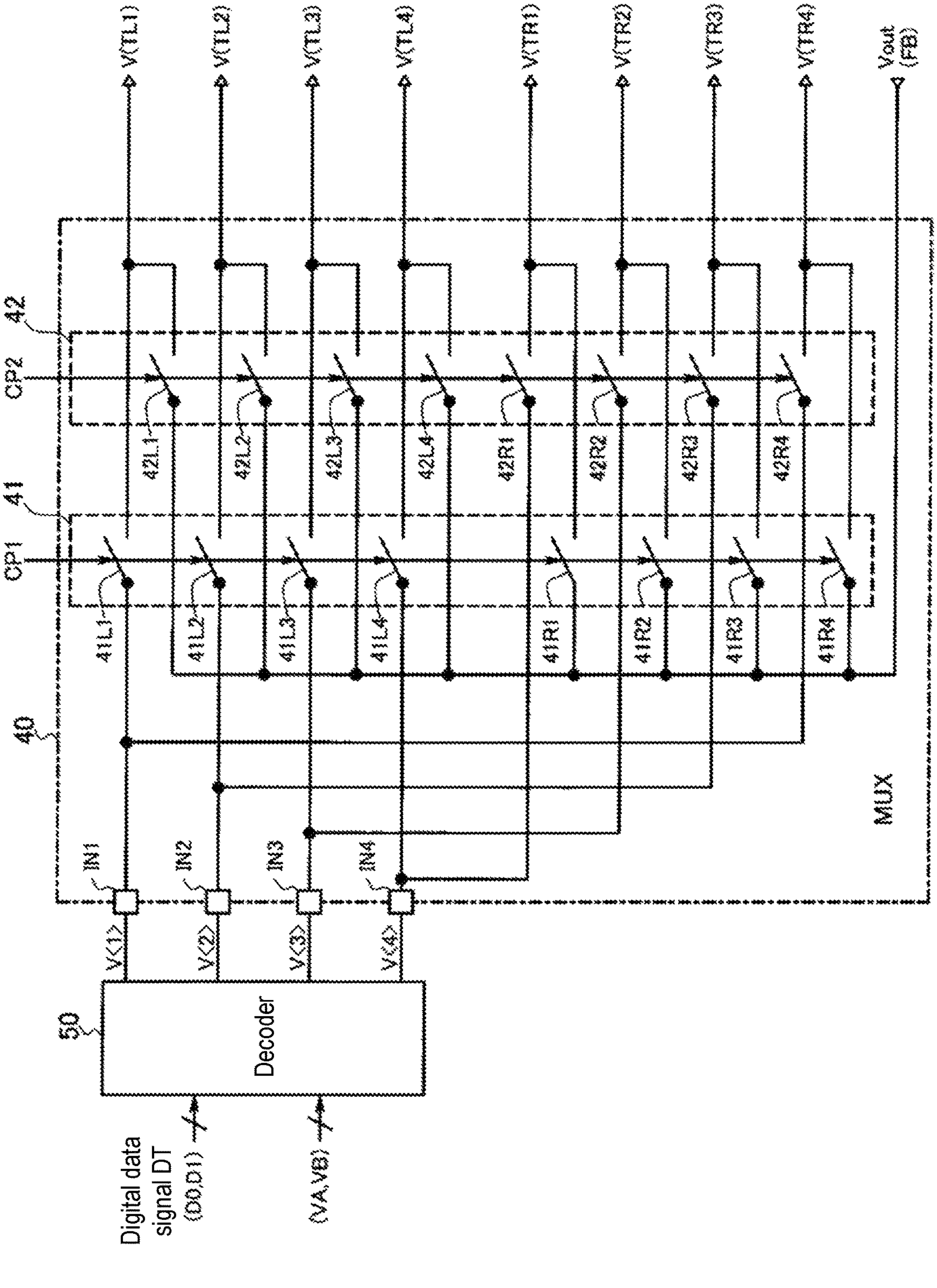
FIG. 7 is a circuit diagram showing another configuration of the MUX in the case of K=2.

FIG. 7 shows another example of the internal configuration of the MUX 40 in the case of K=2 in the differential amplifier 10 of the digital-to-analog converter 100 having the configuration shown in FIG. 1 as the second embodiment.

In FIG. 7, the MUX 40 includes two switch groups 41 and 42, similar to the configuration shown in FIG. 3. Each of the switches 41L1 to 41L4 and 41R1 to 41R4 constituting the switch group 41 is turned on in the first period and turned off in the second period in response to the control signal CP1. Each of the switches 42L1 to 42L4 and 42R1 to 42R4 constituting the switch group 42 is turned on in the second period and turned off in the first period in response to the control signal CP2.

When the switch group 41 is turned on, the voltages V<1> to V<4> supplied from the decoder 50 are output as the voltages V(TL1) to V(TL4) via the switches 41L1 to 41L4, and the feedback voltage FB which is the output voltage Vout is output as the voltages V(TR1) to V(TR4) via the switches 41R1 to 41R4. On the other hand, when the switch group 42 is turned on, the voltage V<1> among the voltages V<1> to V<4> supplied from the decoder 50 is output as the voltage V(TR4) via 42R4, the voltage V<2> is output as the voltage V(TR3) via 42R3, the voltage V<3> is output as the voltage V(TR2) via 42R2, the voltage V<4> is outputted as the voltage V(TR1) via 42R1, and the feedback voltage FB is outputted as the voltages V(TL1) to V(TL4) via the switches 42L1 to 42L4.

Next, the first and second states in the case of the MUX 40 having the internal configuration shown in FIG. 7 will be described. Similar to FIG. 3, in the MUX 40, the input terminals are divided into a group of input terminals IN1 and IN2 receiving the voltages V<1> and V<2> and a group of input terminals IN3 and IN4 receiving the voltages V<3> and V<4>, and the differential pairs are divided into a group of first and second differential pairs (11_1, 12_1) and (11_2, 12_2) and a group of third and fourth differential pairs (11_3, 12_3) and (11_4, 12_4).

Figure 8A:
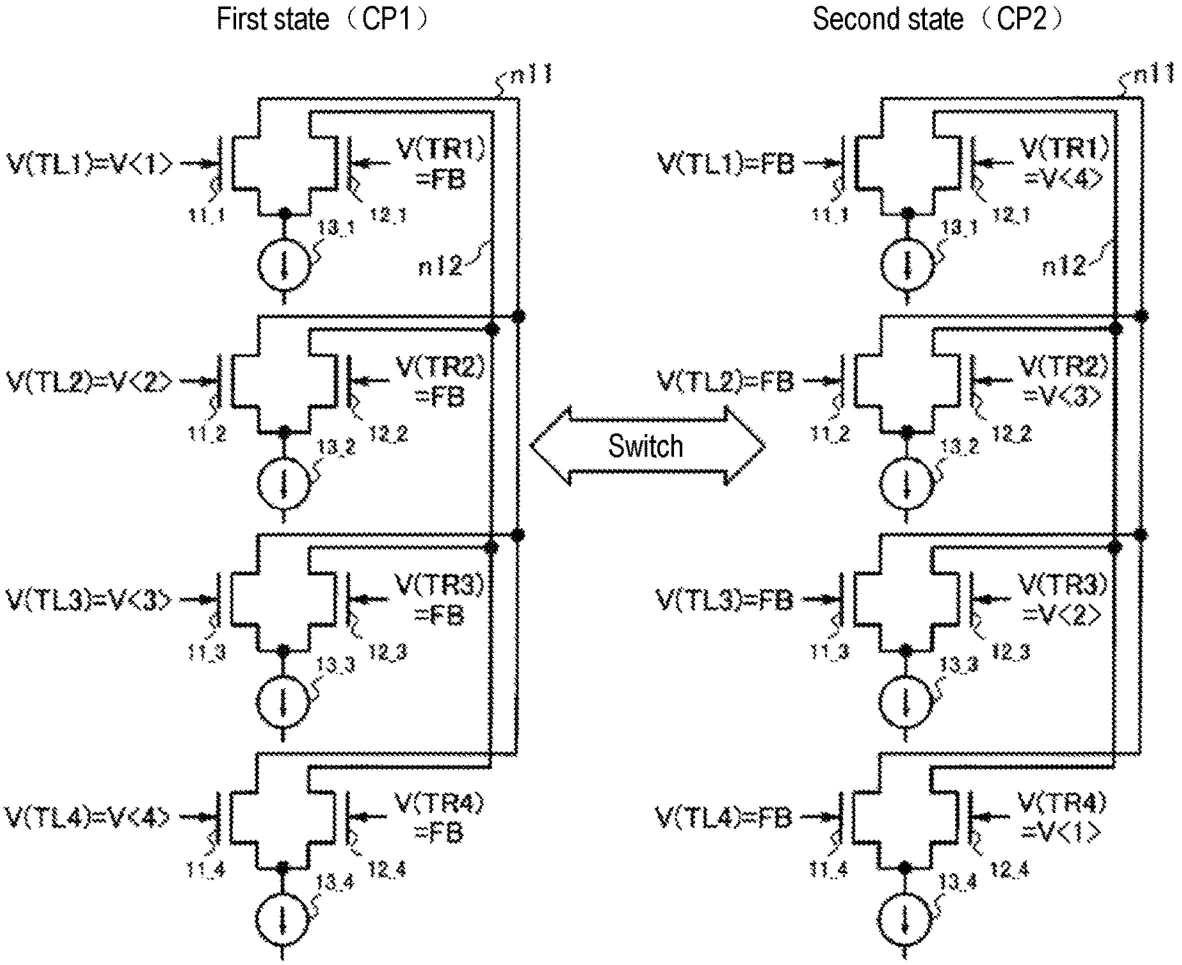
FIG. 8A is a diagram showing the input voltages to the first to fourth differential pairs in the first and second states in the case of the MUX of FIG. 7.

As shown in FIG. 8A, in the first state (CP1), the voltage V<1> is supplied as the voltage V(TL1) to the gate of the transistor 11_1 of the first differential pair (11_1, 12_1), the voltage V<2> is supplied as the voltage V(TL2) to the gate of the transistor 11_2 of the second differential pair (11_2, 12_2), the voltage V<3> is supplied as the voltage V(TL3) to the gate of the transistor 11_3 of the third differential pair (11_3, 12_3), and the voltage V<4> is supplied as the voltage V(TL4) to the gate of the transistor 11_4 of the fourth differential pair (11_4, 12_4). At the same time, the feedback voltage FB is supplied as the voltages V(TR1) to V(TR4) to the gates of the transistors 12_1 to 12_4 of the first to fourth differential pairs (11_1, 12_1) to (11_4, 12_4).

The first state (CP1) occurs during the first period. The second state occurs during the second period after the first period has elapsed. In the second state (CP2), the feedback voltage FB is supplied as the voltages V(TL1) to V(TL4) to the gates of the transistors 11_1 to 11_4 of the first to fourth differential pairs (11_1, 12_1) to (11_4, 12_4). At the same time, the voltage V<4> is supplied as the voltage V(TR1) to the gate of the transistor 12_1 of the first differential pair (11_1, 12_1), the voltage V<3> is supplied as the voltage V(TR2) to the gate of the transistor 12_2 of the second differential pair (11_2, 12_2), the voltage V<2> is supplied as the voltage V(TR3) to the gate of the transistor 12_3 of the third differential pair (11_3, 12_3), and the voltage V<1> is supplied as the voltage V(TR4) to the gate of the transistor 12_4 of the fourth differential pair (11_4, 12_4).

FIG. 8B shows the assignment of the voltages V<1> to V<4> to the voltages V(TL1) to V(TL4) in the first state (CP1) and the voltages V(TR1) to V(TR4) in the second state (CP2) in FIG. 8A described above.

Here, in the case where the voltage levels of the voltages VA and VB are VA=0 and VB=4, voltage level 0 or 4 is assigned to the voltages V<1> to V<4>. Since the digital value (D1, D0) indicated by the digital data signal DT shows four values, (0, 0), (0, 1), (1, 0), and (1, 1), for each of the four values, voltage level 0 or 4 is set to the voltages V(TL1) to V(TL4) in the first state and the voltages V(TR1) to V(TR4) in the second state.

The voltage levels of the selected voltages of the decoder 50 when the digital value (D1, D0) is (0, 0) become V<1>=4 and V<2> to V<4>=0, the voltage levels of the selected voltages of the decoder 50 when the digital value (D1, D0) is (0, 1) become V<1>=V<2>=4 and V<3>=V<4>=0, the voltage levels of the selected voltages of the decoder 50 when the digital value (D1, D0) is (1, 0) become V<1> to V<3>=4 and V<4>=0, and the voltage levels of the selected voltages of the decoder 50 when the digital value (D1, D0) is (1, 1) become V<1> to V<4>=4.

As shown in FIG. 8C, in the first state (CP1) when the digital value (D1, D0) is (0, 0), V(TL1) at voltage level 4 is supplied to the gate of the transistor 11_1 of the first differential pair (11_1, 12_1), and V(TL2) to V(TL4) at voltage level 0 are respectively supplied to the gates of the transistors 11_2 to 11_4 of the second to fourth differential pairs (11_2, 12_2) to (11_4, 12_4). In the second state (CP2) when the digital value (D1, D0) is (0, 0), V(TR4) at voltage level 4 is supplied to the gate of the transistor 12_4 of the fourth differential pair (11_4, 12_4), and V(TR1) to V(TR3) at voltage level 0 are supplied to the gates of the transistors 12_1 to 11_3 of the first to third differential pairs (11_1, 12_1) to (11_3, 12_3). In the first and second states, the output voltage Vout is at voltage level 1.

In the first state (CP1) when the digital value (D1, D0) is (0, 1), V(TL1) and V(TL2) at voltage level 4 are respectively supplied to the gates of the transistors 11_1 and 11_2 of the first and second differential pairs (11_1, 12_1) and (11_2, 12_2), and V(TL3) and V(TL4) at voltage level 0 are supplied to the gates of the transistors 11_3 and 11_4 of the third and fourth differential pairs (11_3, 12_3) and (11_4, 12_4). In the second state (CP2) when the digital value (D1, D0) is (0, 1), V(TR1) and V(TR2) at voltage level 0 are respectively supplied to the gates of the transistors 12_1 and 12_2 of the first and second differential pairs (11_1, 12_1) and (11_2, 12_2), and V(TR3) and V(TR4) at voltage level 4 are respectively supplied to the gates of the transistors 12_3 and 12_4 of the third and fourth differential pairs (11_3, 12_3) and (11_4, 12_4). In the first and second states, the output voltage Vout is at voltage level 2.

In the first state (CP1) when the digital value (D1, D0) is (1, 0), V(TL1) to V(TL3) at voltage level 4 are respectively supplied to the gates of the transistors 11_1 to 11_3 of the first to third differential pairs (11_1, 12_1) to (11_3, 12_3), and V(TL4) at voltage level 0 is supplied to the gate of the transistor 11_4 of the fourth differential pair (11_4, 12_4). In the second state (CP2) when the digital value (D1, D0) is (1, 0), V(TR1) at voltage level 0 is supplied to the gate of the transistor 12_1 of the first differential pair (11_1, 12_1), and V(TR2) to V(TR4) at voltage level 4 are respectively supplied to the gates of the transistors 12_2 to 12_4 of the second to fourth differential pairs (11_2, 12_2) to (11_4, 12_4). In the first and second states, the output voltage Vout is at voltage level 3.

In the first state (CP1) when the digital value (D1, D0) is (1, 1), V(TL1) to V(TL4) at voltage level 4 are respectively supplied to the gates of the transistors 11_1 to 11_4 of the first to fourth differential pairs (11_1, 12_1) to (11_4, 12_4). In the second state (CP2) when the digital value (D1, D0) is (1, 1), V(TR1) to V(TR4) at voltage level 4 are respectively supplied to the gates of the transistors 12_1 to 12_4 of the first to fourth differential pairs (11_1, 12_1) to (11_4, 12_4). In the first and second states, the output voltage Vout is at voltage level 4.

In each of the first to fourth differential pairs (11_1, 12_1) to (11_4, 12_4) of the second embodiment, similar to the first embodiment, the situation of keeping the relationship in which the input voltage from the MUX 40 to the gate of one transistor in the first state (first period) and the input voltage from the MUX 40 to the gate of the other transistor in the subsequent second state (second period) are different from each other is actively created. As can be seen from FIG. 8C, the mutually different voltage relationship occurs in two differential pairs in the case where the digital value (D1, D0) is (0, 0) and (1, 0), and occurs in four differential pairs in the case where the digital value (D1, D0) is (0, 1). Therefore, similar to the first embodiment, it is considered that the second embodiment was able to reduce output variations at voltage levels 1, 2, and 3 of the output voltage Vout. Thus, it is considered that the digital-to-analog converter 100 of the second embodiment can also perform highly accurate offset cancellation.

In addition, in the second embodiment, if the voltage levels of the selected voltages of the decoder 50 when the digital value (D1, D0) is (1, 0) are set to V<1>=V<3>=V<4>=4 and V<2>=0, the voltage values of the voltages V(TL1) to V(TL4) and V(TR1) to V(TR4) supplied to each differential pair in the first and second states for each digital value are as shown in FIG. 9. In FIG. 9, the supply voltages of the voltages V(TL1) to V(TL4) and V(TR1) to V(TR4) when the digital value (D1, D0) is (1, 0) are different from the case shown in FIG. 8C. That is, in the first state (CP1), V(TL1), V(TL3), and V(TL4) at voltage level 4 are respectively supplied to the gates of the transistors 11_1, 11_3, and 11_4 of the first, third, and fourth differential pairs (11_1, 12_1), (11_3, 12_3), and (11_4, 12_4), and V(TL2) at voltage level 0 is supplied to the gate of the transistor 11_2 of the second differential pair (11_2, 12_2). On the other hand, in the second state (CP2) when the digital value (D1, DO) is (1, 0), V(TR1), V(TR2), and V(TR4) at voltage level 4 are respectively supplied to the gates of the transistors 12_1, 12_2, and 12_4 of the first, second, and fourth differential pairs (11_1, 12_1), (11_2, 12_2), and (11_4, 12_4), and V(TR3) at voltage level 0 is supplied to the gate of the transistor 12_3 of the third differential pair (11_3, 12_3). In the first and second states, the output voltage Vout is at voltage level 3.

Third Embodiment

Figure 10:
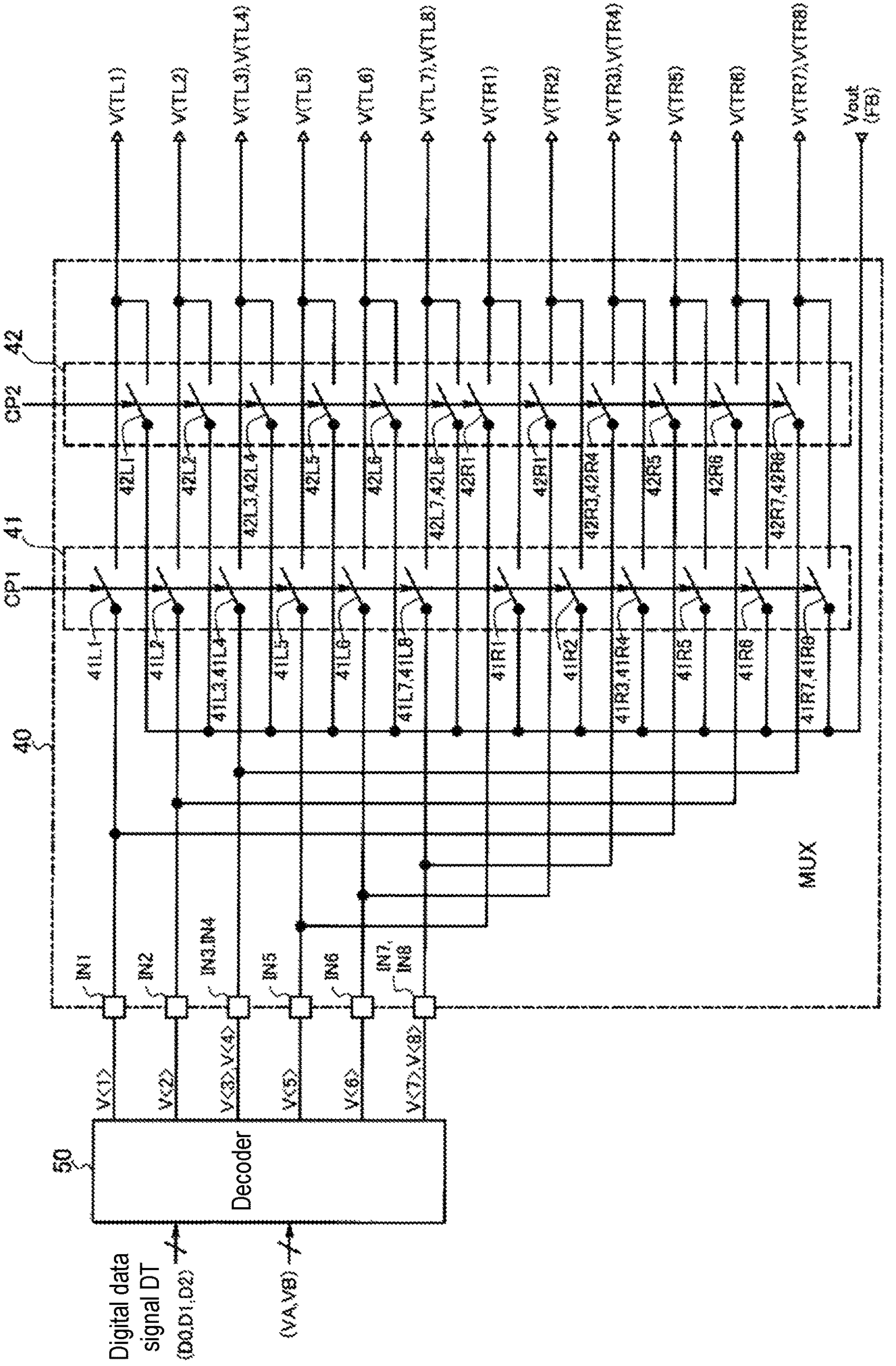
FIG. 10 is a circuit diagram showing the configuration of the MUX in the digital-to-analog converter of FIG. 1 in the case of K=3.

FIG. 10 shows another example of the internal configuration of the MUX 40 in the case of K=3 in the differential amplifier 10 of the digital-to-analog converter 100 having the configuration shown in FIG. 1 as the third embodiment. Although the series related to each of the input terminals IN3 and IN4 are shared as one series in FIG. 10, the series are actually independent like the series related to each of the input terminals IN1 and IN2. Further, although the series related to each of the input terminals IN7 and IN8 are shared as one series, the series are actually independent like the series related to each of the input terminals IN5 and IN6.

In FIG. 10, the MUX 40 includes two switch groups 41 and 42, similar to the configuration shown in FIG. 3. Each of the switches 41L1 to 41L8 and 41R1 to 41R8 constituting the switch group 41 is turned on in the first period and turned off in the second period in response to the control signal CP1. Each of the switches 42L1 to 42L8 and 42R1 to 42R8 constituting the switch group 42 is turned on in the second period and turned off in the first period in response to the control signal CP2.

The digital value of the digital data signal DT supplied to the decoder 50 is (D2, D1, D0). Based on the digital value (D2, D1, D0), the decoder 50 selects the combination voltages V<1> to V<8> of the voltages VA and VB and supplies the voltages V<1> to V<8> to the input terminals IN1 to IN8 of the MUX 40. In addition, in the MUX 40, the input terminals IN1 to IN8 receiving the voltages V<1> to V<8> are divided into a group of input terminals IN1 to IN4 and a group of input terminals IN5 to IN8, and the first to eighth differential pairs are divided into a group of the first to fourth differential pairs (11_1, 12_1) to (11_4, 12_4) and a group of the fifth to eighth differential pairs (11_5, 12_8) to (11_8, 12_8).

In the MUX 40, when the switch group 41 is on, the voltages V<1> to V<4> supplied to the input terminals IN1 to IN4 forming one of the two groups are respectively output as the voltages V(TL1) to V(TL4) to the first differential input terminals (gates of the transistors 11_1 to 11_4) of the first to fourth differential pairs (11_1, 12_1) to (11_4, 12_4) forming one of the two groups via the switches 41L1 to 41L4, the voltages V<5> to V<8> supplied to the input terminals IN5 to IN8 forming the other of the two groups are respectively output as the voltages V(TL5) to V(TL8) to the first differential input terminals (gates of the transistors 11_5 to 11_8) of the fifth to eighth differential pairs (11_5, 12_5) to (11_8, 12_8) forming the other of the two groups via the switches 41L5 to 41L8, and the feedback voltage FB which is the output voltage Vout is respectively output as the voltages V(TR1) to V(TR8) the second differential input terminals (gates of the transistors 12_1 to 12_8) of all the first to eighth differential pairs via the switches 41R1 to 41R8. On the other hand, when the switch group 42 is turned on, the voltages V<1> to V<4> supplied to the input terminals IN1 to IN4 forming one of the two groups are respectively output as the voltages V(TR5) to V(TR8) to the second differential input terminals (gates of the transistors 12_5 to 12_8) of the fifth to eighth differential pairs (11_5, 12_5) to (11_8, 12_8) forming the other of the two groups via the switches 42R5 to 42R8, the voltages V<5> to V<8> supplied to the input terminals IN5 to IN8 forming the other of the two groups are respectively output as the voltages V(TR1) to V(TR4) to the second differential input terminals (gates of the transistors 12_1 to 12_4) of the first to fourth differential pairs (11_1, 12_1) to (11_4, 12_4) forming one of the two groups via the switches 42R1 to 42R4, and the feedback voltage FB is respectively output as the voltages V(TL1) to V(TL8) to the first differential input terminals (gates of the transistors 11_1 to 11_8) of all the first to eighth differential pairs via the switches 42L1 to 42L8.

Thus, the assignment of the voltages V<1> to V<8> to the voltages V(TL1) to V(TL8) supplied to the gates of the transistors 11_1 to 11_8 of the first to eighth differential pairs (11_1, 12_1) to (11_8, 12_8) in the first state (CP1), and the assignment of the voltages V<1> to V<8> to the voltages V(TR1) to V(TR8) supplied to the gates of the transistors 12_1 to 12_8 of the first to eighth differential pairs (11_1, 12_1) to (11_8, 12_8) in the second state (CP2), performed by the MUX 40, are summarized as shown in FIG. 11A.

Here, in the case where the voltage levels of the voltages VA and VB are VA=0 and VB=8, voltage level 0 or 8 is assigned to each of the voltages V<1> to V<8>. Since the digital value (D2, D1, D0) indicated by the digital data signal DT shows eight values, (0, 0, 0), (0, 0, 1), (0, 1, 0), (0, 1, 1), (1, 0, 0), (1, 0, 1), (1, 1, 0), and (1, 1, 1), for each of the eight values, voltage level 0 or 8 is set to the voltages V(TL1) to V(TL8) in the first state and the voltages V(TR1) to V(TR8) in the second state.

The voltage levels of the selected voltages of the decoder 50 when the digital value (D2, D1, D0) is (0, 0, 0) become V<1>=8 and V<2> to V<8>=0, the voltage levels of the selected voltages of the decoder 50 when the digital value (D2, D1, D0) is (0, 0, 1) become V<1>=V<2>=8 and V<3> to V<8>=0, the voltage levels of the selected voltages of the decoder 50 when the digital value (D2, D1, D0) is (0, 1, 0) become V<1>=8, V<2>=0, V<3>=V<4>=8, and V<5> to V<8>=0, and the voltage levels of the selected voltages of the decoder 50 when the digital value (D2, D1, D0) is (0, 1, 1) become V<1> to V<4>=8 and V<5> to V<8>=0. Further, the voltage levels of the selected voltages of the decoder 50 when the digital value (D2, D1, D0) is (1, 0, 0) become V<1>=8, V<2> to V<4>=0, and V<5> to V<8>=8, the voltage levels of the selected voltages of the decoder 50 when the digital value (D2, D1, D0) is (1, 0, 1) become V<1>=V<2>=8, V<3>=V<4>=0, and V<5> to V<8>=8, the voltage levels of the selected voltages of the decoder 50 when the digital value (D2, D1, D0) is (1, 1, 0) become V<1>=8, V<2>=0, and V<3> to V<8>=8, and the voltage levels of the selected voltages of the decoder 50 when the digital value (D2, D1, DO) is (1, 1, 1) become V<1> to V<8>=8.

As shown in FIG. 11B, in the first state (CP1) when the digital value (D2, D1, D0) is (0, 0, 0), V(TL1) at voltage level 8 is supplied to the gate of the transistor 11_1 of the first differential pair (11_1, 12_1), and V(TL2) to V(TL8) at voltage level 0 are respectively supplied to the gates of the transistors 11_2 to 11_8 of the second to eighth differential pairs (11_2, 12_2) to (11_8, 12_8). In the second state (CP2) when the digital value (D2, D1, D0) is (0, 0, 0), V(TR5) at voltage level 8 is supplied to the gate of the transistor 12_5 of the fifth differential pair (11_5, 12_5), and V(TR1) to V(TR4) and V(TR6) to V(TR8) at voltage level 0 are supplied to the gates of the transistors 12_1 to 12_4 and 12_6 to 12_8 of the other first to fourth and sixth to eighth differential pairs (11_1, 12_1) to (11_4, 12_4) and (11_6, 12_6) to (11_8, 12_8). In the first and second states, the output voltage Vout is at voltage level 1.

In the first state (CP1) when the digital value (D2, D1, D0) is (0, 0, 1), V(TL1) and V(TL2) at voltage level 8 are respectively supplied to the gates of the transistors 11_1 and 11_2 of the first and second differential pairs (11_1, 12_1) and (11_2, 12_2), and V(TL3) to V(TL8) at voltage level 0 are supplied to the gates of the transistors 11_3 to 11_8 of the third to eighth differential pairs (11_3, 12_3) to (11_8, 12_8). In the second state (CP2) when the digital value (D2, D1, D0) is (0, 0, 1), V(TR1) to V(TR4) at voltage level 0 are respectively supplied to the gates of the transistors 12_1 to 12_4 of the first to fourth differential pairs (11_1, 12_1) to (11_4, 12_4), V(TR7) and V(TR8) at voltage level 0 are also respectively supplied to the gates of the transistors 12_7 and 12_8 of the seventh and eighth differential pairs (11_7, 12_7) and (11_8, 12_8), and V(TR5) and V(TR6) at voltage level 8 are respectively supplied to the gates of the transistors 12_5 and 12_6 of the fifth and sixth differential pairs (11_5, 12_5) and (11_6, 12_6). In the first and second states, the output voltage Vout is at voltage level 2.

In the first state (CP1) when the digital value (D2, D1, D0) is (0, 1, 0), V(TL1), V(TL3), and V(TL4) at voltage level 8 are respectively supplied to the gates of the transistors 11_1, 11_3, and 11_4 of the first, third, and fourth differential pairs (11_1, 12_1), (11_3, 12_3), and (11_4, 12_4), and V(TL2) and V(TL5) to V(TL8) at voltage level 0 are respectively supplied to the gates of the transistors 11_2 and 11_5 to 11_8 of the second and fifth to eighth differential pairs (11_2, 12_2) and (11_5, 12_5) to (11_8, 12_8). In the second state (CP2) when the digital value (D2, D1, D0) is (0, 1, 0), V(TR1) to V(TR4) and V(TR6) at voltage level 0 are respectively supplied to the gates of the transistors 12_1 to 12_4 and 12_6 of the first to fourth and sixth differential pairs (11_1, 12_1) to (11_4, 12_4) and (11_6, 12_6), and V(TR5), V(TR7), and V(TR8) at voltage level 8 are respectively supplied to the gates of the transistors 12_5, 12_7, and 12_8 of the fifth, seventh, and eighth differential pairs (11_5, 12_5), (11_7, 12_7), and (11_8, 12_8). In the first and second states, the output voltage Vout is at voltage level 3.

In the first state (CP1) when the digital value (D2, D1, D0) is (0, 1, 1), V(TL1) to V(TL4) of voltage level 8 are respectively supplied to the gates of the transistors 11_1 to 11_4 of the first to fourth differential pairs (11_1, 12_1) to (11_4, 12_4), and V(TL5) to V(TL8) at voltage level 0 are respectively supplied to the gates of the transistors 11_5 to 11_8 of the fifth to eighth differential pairs (11_5, 12_5) to (11_8, 12_8). In the second state (CP2) when the digital value (D2, D1, D0) is (0, 1, 1), V(TR1) to V(TR4) at voltage level 0 are respectively supplied to the gates of the transistors 12_1 to 12_4 of the first to fourth differential pairs (11_1, 12_1) to (11_4, 12_4), and V(TR5) to V(TR8) at voltage level 8 are respectively supplied to the gates of the transistors 12_5 to 12_8 of the fifth to eighth differential pairs (11_5, 12_5) to (11_8, 12_8). In the first and second states, the output voltage Vout is at voltage level 4.

In the first state (CP1) when the digital value (D2, D1, D0) is (1, 0, 0), V(TL1) and V(TL5) to V(TL8) at voltage level 8 are supplied to the gates of the transistors 11_1 and 11_5 to 11_8 of the first and fifth to eighth differential pairs (11_1, 12_1) and (11_5, 12_5) to (11_8, 12_8), and V(TL2) to V(TL4) at voltage level 0 are respectively supplied to the gates of the transistors 11_2 to 11_4 of the second to fourth differential pairs (11_2, 12_2) to (11_4, 12_4). In the second state (CP2) when the digital value (D2, D1, D0) is (1, 0, 0), V(TR1) to V(TR5) at voltage level 8 are supplied to the gates of the transistors 12_1 to 12_5 of the first to fifth differential pairs (11_1, 12_1) to (11_5, 12_5), and V(TR6) to V(TR8) at voltage level 0 are supplied to the gates of the transistors 12_6 to 12_8 of the other sixth to eighth differential pairs (11_6, 12_6) to (11_8, 12_8). In the first and second states, the output voltage Vout is at voltage level 5.

In the first state (CP1) when the digital value (D2, D1, D0) is (1, 0, 1), V(TL1), V(TL2) and V(TL5) to V(TL8) at voltage level 8 are respectively supplied to the gates of the transistors 11_1, 11_2, and 11_5 to 11_8 of the first, second, and fifth to eighth differential pairs (11_1, 12_1), (11_2, 12_2), and (11_5, 12_5) to (11_8, 12_8), and V(TL3) and V(TL4) at voltage level 0 are supplied to the gates of the transistors 11_3 and 11_4 of the other third and fourth differential pairs (11_3, 12_3) and (11_4, 12_4). In the second state (CP2) when the digital value (D2, D1, D0) is (1, 0, 1), V(TR1) to V(TR6) at voltage level 8 are respectively supplied to the gates of the transistors 12_1 to 12_6 of the first to sixth differential pairs (11_1, 12_1) to (11_6, 12_6), and V(TR7) and V(TR8) at voltage level 0 are respectively supplied to the gates of the transistors 12_7 and 12_8 of the other seventh and eighth differential pairs (11_7, 12_7) and (11_8, 12_8). In the first and second states, the output voltage Vout is at voltage level 6.

In the first state (CP1) when the digital value (D2, D1, D0) is (1, 1, 0), V(TL1) and V(TL3) to V(TL8) at voltage level 8 are respectively supplied to the gates of the transistors 11_1 and 11_3 to 11_8 of the first and third to eighth differential pairs (11_1, 12_1) and (11_3, 12_3) to (11_8, 12_8), and V(TL2) at voltage level 0 is supplied to the gate of the transistor 11_2 of the remaining second differential pair (11_2, 12_2). In the second state (CP2) when the digital value (D2, D1, D0) is (1, 1, 0), V(TR1) to V(TR5), V(TR7), and V(TR8) are respectively supplied to the gates of the transistors 12_1 to 12_5, 12_7, and 12_8 of the first to fifth, seventh, and eighth differential pairs (11_1, 12_1) to (11_5, 12_5), (11_7, 12_7), and (11_8, 12_8), and V(TR6) at voltage level 0 is supplied to the gate of the transistor 12_6 of the remaining sixth differential pair (11_6, 12_6). In the first and second states, the output voltage Vout is at voltage level 7.

In the first state (CP1) when the digital value (D2, D1, D0) is (1, 1, 1), V(TL1) to V(TL8) at voltage level 8 are respectively supplied to the gates of the transistors 11_1 to 11_8 of the first to eighth differential pairs (11_1, 12_1) to (11_8, 12_8). In the second state (CP2) when the digital value (D2, D1, D0) is (1, 1, 1), V(TR1) to V(TR8) at voltage level 8 are respectively supplied to the gates of the transistors 12_1 to 12_8 of the first to eighth differential pairs (11_1, 12_1) to (11_8, 12_8). In the first and second states, the output voltage Vout is at voltage level 8.

In each of the first to eighth differential pairs (11_1, 12_1) to (11_8, 12_8) of the third embodiment, similar to the first and second embodiments, the situation of keeping the relationship in which the input voltage from the MUX 40 to the gate of one transistor in the first state (first period) and the input voltage from the MUX 40 to the gate of the other transistor in the subsequent second state (second period) are different from each other is actively created. As the mutually different voltage relationship, specifically, if the input voltage level from the MUX 40 to the gate of one transistor of the differential pair in the first state (first period) is 0, the input voltage level from the MUX 40 to the gate of the other transistor of the differential pair in the second state (second period) becomes 8; conversely, if the input voltage level from the MUX 40 to the gate of one transistor of the differential pair in the first state (first period) is 8, the input voltage level from the MUX 40 to the gate of the other transistor of the differential pair in the second state (second period) becomes 0. As can be seen from FIG. 11B, the mutually different voltage relationship occurs in two differential pairs in the case where the digital value (D2, D1, D0) is (0, 0, 0) and (1, 1, 0), and occurs in four differential pairs in the case where the digital value (D2, D1, D0) is (0, 0, 1) and (1, 0, 1). Further, the mutually different voltage relationship occurs in six differential pairs in the case where the digital value (D2, D1, D0) is (0, 1, 0) and (1, 0, 0), and occurs in all eight differential pairs in the case where the digital value (D2, D1, DO) is (0, 1, 1).

In addition, in FIG. 11B, in each of the first state and the second state, the input voltages V(TL3) and V(TR3) of the third differential pair and the input voltages V(TL4) and V(TR4) of the fourth differential pair are respectively supplied at the same voltage level regardless of the digital value (D2, D1, D0). Similarly, the input voltages V(TL7) and V(TR7) of the seventh differential pair and the input voltages V(TL8) and V(TR8) of the eighth differential pair in the first state and the second state are respectively supplied at the same voltage level regardless of the digital value (D2, D1, D0). Furthermore, according to FIG. 11A, in switching between the first state and the second state, the voltages V<3> and V<7> are supplied as the input voltages of the third differential pair, the voltages V<4> and V<8> are supplied as the input voltages of the fourth differential pair, the voltages V<7> and V<3> are supplied as the input voltages of the seventh differential pair, and the voltages V<8> and V<4> are supplied as the input voltages of the eighth differential pair. Therefore, the voltages V<3> and V<4> are equal, and the voltages V<7> and V<8> are also equal. In such a case, as shown in FIG. 10, the MUX 40 can share the input terminals (IN3, IN4) that receive the voltages V<3> and V<4> selected by the decoder 50, and share the input terminals (IN7, IN8) that receive the voltages V<7> and V<8>. Furthermore, the first differential input terminals that receive the input voltages V(TL3) and V(TL4) can be respectively shared by the third and fourth differential pairs, and the second differential input terminals that receive the input voltages V(TR3) and V(TR4) can be respectively shared by the third and fourth differential pairs. Similarly, the first differential input terminals that receive the input voltages V(TL7) and V(TL8) can be respectively shared by the seventh and eighth differential pairs, and the second differential input terminals that receive the input voltages V(TR7) and V(TR8) can be respectively shared by the seventh and eighth differential pairs. Furthermore, the two switches (41L3, 41L4), (41R3, 41R4), (41L7, 41L8), (41R7, 41R8), (42L3, 42L4), (42R3, 42R4), (42L7, 42L8), and (42R7, 42R8) that connect the shared terminals and the shared terminals and the terminals receiving the feedback voltage FB in the switch groups 41 and 42 can also be shared.

Figure 12:
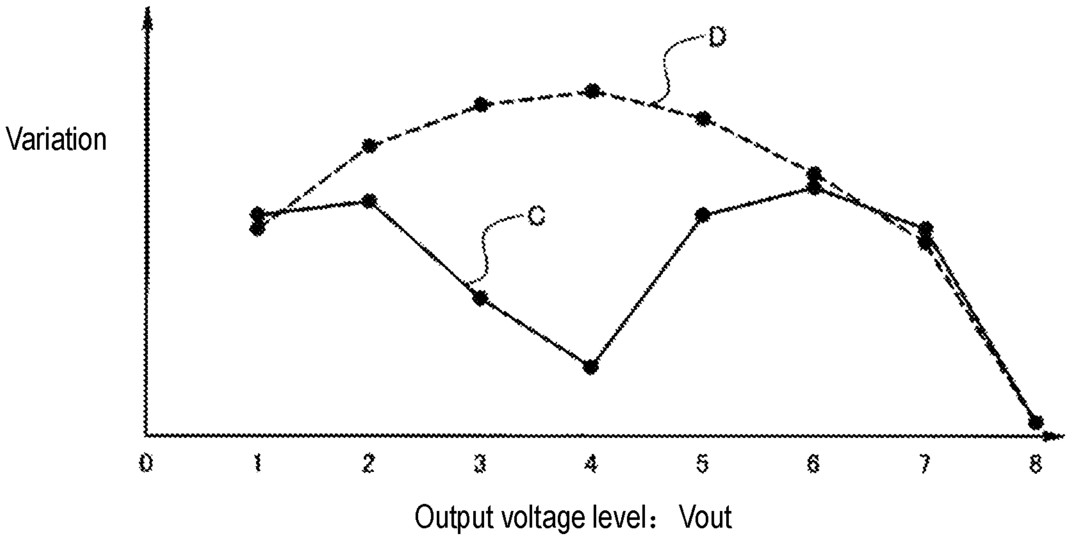
FIG. 12 is a diagram showing the characteristics as a result of estimating variations in output voltage by Monte Carlo simulation in the case where the voltage levels are VA=0 and VB=8.

The characteristics shown by the solid line C in FIG. 12 were obtained by estimating by Monte Carlo simulation the output variations of each of voltage levels 1 to 8 of the output voltage Vout in the case of the third embodiment in which K=3 and the voltage levels of the voltages VA and VB are set to VA=0 and VB=8 described above. The broken line D in FIG. 12 shows the characteristics to be compared with the characteristics shown by the solid line C. The characteristics shown by the broken line D are the output variations in the case of the related art in which the input signal is switched between the first state (first period) and the second state (second period) between the gates of two transistors for each differential pair. Upon comparison of the two characteristics, the third embodiment was able to reduce output variations at voltage levels 2 to 6 of the output voltage Vout corresponding to the case where the digital value (D2, D1, D0) is (0, 0, 1) to (1, 0, 1). In particular, it was found that the effect of reducing output variations is large in the case where the output voltage Vout is at voltage levels 3 to 5 where the mutually different voltage relationship described above occurs in a large number of differential pairs, and particularly the reduction effect is greatest at voltage level 4 which is between the voltages VA and VB. According to the result of this Monte Carlo simulation, the digital-to-analog converter 100 of the third embodiment can perform highly accurate offset cancellation.

Fourth Embodiment

The internal configuration of the MUX 40 in the case of K=3 is not limited to the configuration shown in FIG. 10, and may be set so that when the switch group 42 in FIG. 10 is turned on, the voltages V<1> to V<8> supplied from the decoder 50 are respectively output as the voltages V(TR8) to V(TR1) via the switches 42R8 to 42R1, and the feedback voltage FB is respectively output as the voltages V(TL1) to V(TL8) via the switches 42L1 to 42L8.

In the MUX 40 having such an internal configuration, the assignment of the voltages V<1> to V<8> to the voltages V(TL1) to V(TL8) supplied to the gates of the transistors 11_1 to 11_8 of the first to eighth differential pairs (11_1, 12_1) to (11_8, 12_8) in the first state (CP1), and the assignment of the voltages V<8> to V<1> to the voltages V(TR1) to V(TR8) supplied to the gates of the transistors 12_1 to 12_8 of the first to eighth differential pairs (11_1, 12_1) to (11_8, 12_8) in the second state (CP2) are summarized as shown in FIG. 13A.

Here, in the fourth embodiment, similar to the third embodiment described above, the voltage levels of the voltages VA and VB are set to VA=0 and VB=8, and the decoder 50 outputs the voltages V<1> to V<8> to the MUX 40 based on the digital value (D2, D1, D0). The voltage levels of the voltages V(TL1) to V(TL8) in the first state (CP1) and the voltage levels of the voltages V(TR1) to V(TR8) in the second state (CP2) for each digital value (D2, D1, D0) in this case are as follows.

As shown in FIG. 13B, in the first state (CP1) when the digital value (D2, D1, D0) is (0, 0, 0), V(TL1) at voltage level 8 is supplied to the gate of the transistor 11_1 of the first differential pair (11_1, 12_1), and V(TL2) to V(TL8) at voltage level 0 are respectively supplied to the gates of the transistors 11_2 to 11_8 of the second to eighth differential pairs (11_2, 12_2) to (11_8, 12_8).

In the second state (CP2) when the digital value (D2, D1, D0) is (0, 0, 0), V(TR1) to V(TR7) at voltage level 0 are supplied to the gates of the transistors 12_1 to 12_7 of the first to seventh differential pairs (11_1, 12_1) to (11_7, 12_7), and V(TR8) at voltage level 8 is supplied to the gate of the transistor 12_8 of the eighth differential pair (11_8, 12_8). In the first and second states, the output voltage Vout is at voltage level 1.

In the first state (CP1) when the digital value (D2, D1, D0) is (0, 0, 1), V(TL1) and V(TL2) at voltage level 8 are respectively supplied to the gates of the transistors 11_1 and 11_2 of the first and second differential pairs (11_1, 12_1) and (11_2, 12_2), and V(TL3) to V(TL8) at voltage level 0 are supplied to the gates of the transistors 11_3 to 11_8 of the third to eighth differential pairs (11_3, 12_3) to (11_8, 12_8). In the second state (CP2) when the digital value (D2, D1, D0) is (0, 0, 1), V(TR1) to V(TR6) at voltage level 0 are respectively supplied to the gates of the transistors 12_1 to 12_6 of the first to sixth differential pairs (11_1, 12_1) to (11_6, 12_6), and V(TR7) and V(TR8) at voltage level 8 are also respectively supplied to the gates of the transistors 12_7 and 12_8 of the seventh and eighth differential pairs (11_7, 12_7) and (11_8, 12_8). In the first and second states, the output voltage Vout is at voltage level 2.

In the first state (CP1) when the digital value (D2, D1, D0) is (0, 1, 0), V(TL1), V(TL3), and V(TL4) at voltage level 8 are respectively supplied to the gates of the transistors 11_1, 11_3, and 11_4 of the first, third, and fourth differential pairs (11_1, 12_1), (11_3, 12_3), and (11_4, 12_4), and V(TL2) and V(TL5) to V(TL8) at voltage level 0 are respectively supplied to the gates of the transistors 11_2 and 11_5 to 11_8 of the second and fifth to eighth differential pairs (11_2, 12_2) and (11_5, 12_5) to (11_8, 12_8). In the second state (CP2) when the digital value (D2, D1, D0) is (0, 1, 0), V(TR1) to V(TR4) and V(TR7) at voltage level 0 are respectively supplied to the gates of the transistors 12_1 to 12_4 and 12_7 of the first to fourth and seventh differential pairs (11_1, 12_1) to (11_4, 12_4) and (11_7, 12_7), and V(TR5), V(TR6), and V(TR8) at voltage level 8 are respectively supplied to the gates of the transistors 12_5, 12_6, and 12_8 of the fifth, sixth, and eighth differential pairs (11_5, 12_5), (11_6, 12_6), and (11_8, 12_8). In the first and second states, the output voltage Vout is at voltage level 3.

In the first state (CP1) when the digital value (D2, D1, D0) is (0, 1, 1), V(TL1) to V(TL4) at voltage level 8 are respectively supplied to the gates of the transistors 11_1 to 11_4 of the first to fourth differential pairs (11_1, 12_1) to (11_4, 12_4), and V(TL5) to V(TL8) at voltage level 0 are respectively supplied to the gates of the transistors 11_5 to 11_8 of the fifth to eighth differential pairs (11_5, 12_5) to (11_8, 12_8).

In the second state (CP2) when the digital value (D2, D1, D0) is (0, 1, 1), V(TR1) to V(TR4) at voltage level 0 are respectively supplied to the gates of the transistors 12_1 to 12_4 of the first to fourth differential pairs (11_1, 12_1) to (11_4, 12_4), and V(TR5) to V(TRL8) at voltage level 8 are respectively supplied to the gates of the transistors 12_5 to 12_8 of the fifth to eighth differential pairs (11_5, 12_5) to (11_8, 12_8). In the first and second states, the output voltage Vout is at voltage level 4.

In the first state (CP1) when the digital value (D2, D1, D0) is (1, 0, 0), V(TL1) and V(TL5) to V(TL8) at voltage level 8 are supplied to the gates of the transistors 11_1 and 11_5 to 11_8 of the first and fifth to eighth differential pairs (11_1, 12_1) and (11_5, 12_5) to (11_8, 12_8), and V(TL2) to V(TL4) at voltage level 0 are respectively supplied to the gates of the transistors 11_2 to 11_4 of the second to fourth differential pairs (11_2, 12_2) to (11_4, 12_4). In the second state (CP2) when the digital value (D2, D1, D0) is (1, 0, 0), V(TR1) to V(TR4) and V(TR8) at voltage level 8 are supplied to the gates of the transistors 12_1 to 12_4 and 12_8 of the first to fourth and eighth differential pairs (11_1, 12_1) to (11_4, 12_4) and (11_8, 12_8), and V(TR5) to V(TR7) at voltage level 0 are supplied to the gates of the transistors 12_5 to 12_7 of the other fifth to seventh differential pairs (11_5, 12_5) to (11_7, 12_7). In the first and second states, the output voltage Vout is at voltage level 5.

In the first state (CP1) when the digital value (D2, D1, D0) is (1, 0, 1), V(TL1), V(TL2), and V(TL5) to V(TL8) at voltage level 8 are respectively supplied to the gates of the transistors 11_1, 11_2, and 11_5 to 11_8 of the first, second, and fifth to eighth differential pairs (11_1, 12_1), (11_2, 12_2), and (11_5, 12_5) to (11_8, 12_8), and V(TL3) and V(TL4) at voltage level 0 are supplied to the gates of the transistors 11_3 and 11_4 of the other third and fourth differential pairs (11_3, 12_3) and (11_4, 12_4). In the second state (CP2) when the digital value (D2, D1, D0) is (1, 0, 1), V(TR1) to V(TR4), V(TR7), and V(TR8) at voltage level 8 are respectively supplied to the gates of the transistors 12_1 to 12_4, 12_7, and 12_8 of the first to fourth, seventh, and eighth differential pairs (11_1, 12_1) to (11_4, 12_4), (11_7, 12_7), and (11_8, 12_8), and V(TR5) and V(TR6) at voltage level 0 are respectively supplied to the gates of the transistors 12_5 and 12_6 of the other fifth and sixth differential pairs (11_5, 12_5) and (11_6, 12_6). In the first and second states, the output voltage Vout is at voltage level 6.

In the first state (CP1) when the digital value (D2, D1, D0) is (1, 1, 0), V(TL1) and V(TL3) to V(TL8) at voltage level 8 are respectively supplied to the gates of the transistors 11_1 and 11_3 to 11_8 of the first and third to eighth differential pairs (11_1, 12_1) and (11_3, 12_3) to (11_8, 12_8), and V(TL2) at voltage level 0 is supplied to the gate of the transistor 11_2 of the remaining second differential pair (11_2, 12_2). In the second state (CP2) when the digital value (D2, D1, D0) is (1, 1, 0), V(TR1) to V(TR6) and V(TR8) at voltage level 8 are respectively supplied to the gates of the transistors 12_1 to 12_6 and 12_8 of the first to sixth and eighth differential pairs (11_1, 12_1) to (11_6, 12_6) and (11_8, 12_8), and V(TR7) at voltage level 0 is supplied to the gate of the transistor 12_7 of the remaining seventh differential pair (11_7, 12_7).

In the first and second states, the output voltage Vout is at voltage level 7.

In the first state (CP1) when the digital value (D2, D1, D0) is (1, 1, 1), V(TL1) to V(TL8) at voltage level 8 are respectively supplied to the gates of the transistors 11_1 to 11_8 of the first to eighth differential pairs (11_1, 12_1) to (11_8, 12_8). In the second state (CP2) when the digital value (D2, D1, D0) is (1, 1, 1), V(TR1) to V(TR8) at voltage level 8 are respectively supplied to the gates of the transistors 12_1 to 12_8 of the first to eighth differential pairs (11_1, 12_1) to (11_8, 12_8). In the first and second states, the output voltage Vout is at voltage level 8.

In each of the first to eighth differential pairs (11_1, 12_1) to (11_8, 12_8) of the fourth embodiment, similar to the third embodiment, the situation of keeping the relationship in which the input voltage from the MUX 40 to the gate of one transistor in the first state (first period) and the input voltage from the MUX 40 to the gate of the other transistor in the subsequent second state (second period) are different from each other is actively created. As can be seen from FIG. 13B, the mutually different voltage relationship occurs in two differential pairs in the case where the digital value (D2, D1, D0) is (0, 0, 0) and (1, 1, 0), and occurs in four differential pairs in the case where the digital value (D2, D1, D0) is (0, 0, 1) and (1, 0, 1). Further, the mutually different voltage relationship occurs in six differential pairs in the case where the digital value (D2, D1, D0) is (0, 1, 0) and (1, 0, 0), and occurs in all eight differential pairs in the case where the digital value (D2, D1, D0) is (0, 1, 1). According to these, similar to the third embodiment, the output variations at voltage levels 1 to 6 of the output voltage Vout can be reduced. Thus, the digital-to-analog converter 100 of the fourth embodiment can also perform highly accurate offset cancellation.

In addition, according to FIG. 13B, in each of the first state and the second state, the input voltages V(TL3) and V(TR3) of the third differential pair and the input voltages V(TL4) and V(TR4) of the fourth differential pair are respectively supplied at the same voltage level regardless of the digital value (D2, D1, D0), and similarly, the input voltages V(TL5) and V(TR5) of the fifth differential pair and the input voltages V(TL6) and V(TR6) of the sixth differential pair are respectively supplied at the same voltage level regardless of the digital value (D2, D1, D0). Furthermore, according to FIG. 13A, in switching between the first state and the second state, the voltages V<3> and V<6> are supplied as the input voltages of the third differential pair, the voltages V<4> and V<5> are supplied as the input voltages of the fourth differential pair, the voltages V<5> and V<4> are supplied as the input voltages of the fifth differential pair, and the voltages V<6> and V<3> are supplied as the input voltages of the sixth differential pair. Therefore, the voltages V<3> and V<4> are equal, and the voltages V<5> and V<6> are also equal. In such a case, as shown in FIG. 10, the MUX 40 can share the input terminals that receive the voltages V<3> and V<4>, and share the input terminals that receive the voltages V<5> and V<6>. Furthermore, the first differential input terminals that receive the input voltages V(TL3) and V(TL4) can be respectively shared by the third and fourth differential pairs, and the second differential input terminals that receive the input voltages V(TR3) and V(TR4) can be respectively shared by the third and fourth differential pairs. Similarly, the first differential input terminals that receive the input voltages V(TL5) and V(TL6) can be respectively shared by the fifth and sixth differential pairs, and the second differential input terminals that receive the input voltages V(TR5) and V(TR6) can be respectively shared by the fifth and sixth differential pairs. Furthermore, the two switches that connect the shared terminals and the shared terminals and the terminals receiving the feedback voltage FB in the switch groups 41 and 42 can also be shared.

Fifth Embodiment

Figure 14:
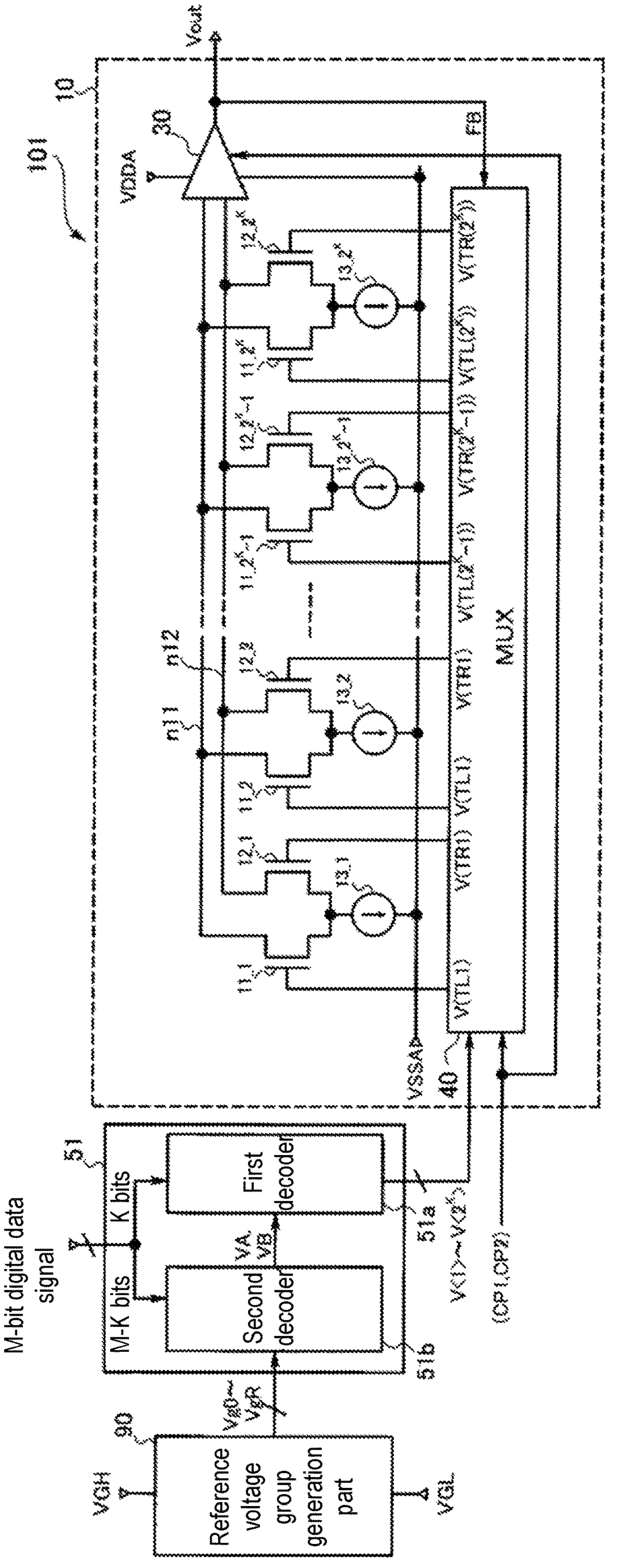
FIG. 14 is a circuit diagram showing another configuration of the digital-to-analog converter according to the disclosure.

FIG. 14 shows the schematic configuration of a digital-to-analog converter as the fifth embodiment of the disclosure. In FIG. 14, this digital-to-analog converter is indicated by reference numeral 101. The digital-to-analog converter 101 includes a reference voltage group generation part 90, a decoder 51, and a differential amplifier 10 including $2^K$ (K is an integer of 2 or more) differential pairs, and converts an M-bit digital data signal DT into an output voltage Vout having an analog voltage level. Here, M is greater than K (M>K).

The reference voltage group generation part 90 generates reference voltages Vg0 to VgR (R is an integer of 2 or more) having different voltage values based on reference power supply voltages VGH and VGL, and supplies the reference voltages Vg0 to VgR to the decoder 51.

The decoder 51 includes a first decoder 51*a* and a second decoder 51*b*. The second decoder 51*b* is supplied with upper M-K bits of the M-bit digital data signal DT, the remaining lower K bits of the M-bit digital data signal DT are supplied to the first decoder 51*a*. The second decoder 51*b* is connected to the reference voltage group generation part 90. The second decoder 51*b* selects two adjacent reference voltages VA and VB corresponding to the digital value of M-K bits of the digital data signal DT from the reference voltages Vg0 to VgR supplied from the reference voltage group generation part 90. The first decoder 51*a* is the same as the decoder 50 shown in the first embodiment, and generates the combination voltages V<1> to V<2> composed of $2^K$ voltages using the voltages VA and VB based on the digital value of K bits of the digital data signal DT, and supplies the generated voltages V<1> to V<2> to the differential amplifier 10.

Since the differential amplifier 10 has the same configuration as shown in the first embodiment, further description is omitted here.

In the reference voltage group generation part 90 of the digital-to-analog converter 101 having such a configuration, in the case of K=2, the reference voltages Vg0 to VgR are generated at intervals of 4 levels such as voltage levels 0, 4, 8, 12, . . . . The second decoder 51*b* selects two mutually adjacent reference voltages VA and VB corresponding to the digital value of (M-2) bits of the digital data signal DT. As shown in FIG. 15A, for example, the voltage levels of (VA, VB) are selected in combinations such as (0, 4), (4, 8), (8, 12), . . . .

Further, as shown in FIG. 15A, in the case where the voltage levels of (VA, VB) are (0, 4), in the first decoder 51*a*, four combination voltages V<1> to V<4> of the voltage VA or VB are generated in a combination of voltage levels (0, 4), and the output voltage Vout of the differential amplifier 10 becomes one of voltage levels 1, 2, 3, and 4 according to the digital value (D1, D0) of the lower two bits of the digital data signal DT.

Similarly, in the case where the voltage levels of (VA, VB) are (4, 8), in the first decoder 51*a*, the voltages V<1> to V<4> are generated in a combination of voltage levels (4, 8), and the output voltage Vout of the differential amplifier 10 becomes one of voltage levels 5, 6, 7, and 8 according to the digital value (D1, D0) of the lower two bits. In the case where (VA, VB) are voltage levels (8, 12), in the first decoder 51*a*, the voltages V<1> to V<4> are generated in a combination of voltage levels (8, 12), and the output voltage Vout of the differential amplifier 10 becomes one of voltage levels 9, 10, 11, and 12 according to the digital value (D1, D0) of the lower two bits.

Further, in the reference voltage group generation part 90, in the case of K=3, the reference voltages Vg0 to VgR are generated at intervals of 8 levels such as voltage levels 0, 8, 16, 24, . . . . The second decoder 51*b* selects two mutually adjacent reference voltages VA and VB corresponding to the digital value of the upper (M-3) bits of the digital data signal DT. As shown in FIG. 15B, for example, the voltage levels of (VA, VB) are selected in combinations such as (0, 8), (8, 16), (16, 24), . . . .

In addition, as shown in FIG. 15B, in the case where the voltage levels of (VA, VB) are (0, 8), in the first decoder 51*a*, eight combination voltages V<1> to V<8> of the voltage VA or VB are generated in a combination of voltage levels (0, 8), and the output voltage Vout of the differential amplifier 10 becomes one of voltage levels 1, 2, 3, 4, 5, 6, 7, and 8 according to the digital value (D2, D1, D0) of the lower three bits of the digital data signal DT.

Similarly, in the case where the voltage levels of (VA, VB) are (8, 16), in the first decoder 51*a*, the voltages V<1> to V<8> are generated in a combination of voltage levels (8, 16), and the output voltage Vout of the differential amplifier 10 becomes one of voltage levels 9, 10, 11, 12, 13, 14, 15, and 16 according to the digital value (D2, D1, D0) of the lower three bits. In the case where (VA, VB) are voltage levels (16, 24), in the first decoder 51*a*, the voltages V<1> to V<8> are generated in a combination of voltage levels (16, 24), and the output voltage Vout of the differential amplifier 10 becomes one of voltage levels 17, 18, 19, 20, 21, 22, 23, and 24 according to the digital value (D2, D1, D0) of the lower three bits.

In this way, the digital-to-analog converter 101 shown in FIG. 14 can generate a large number of reference voltages by the reference voltage group generation part 90, select two mutually adjacent reference voltages (VA, VB) corresponding to the digital value of (M-K) bits from these reference voltages, and further generate combination voltages V<1> to V<$2^K$> composed of $2^K$ voltages using the voltages (VA, VB). Therefore, the differential amplifier 10 can realize amplified outputs of various multi-value voltage levels. In addition, the output voltages output from the differential amplifier 10 based on $2^K$ voltages using the reference voltages (VA, VB) are $2^K$ voltages including linear interpolation voltages of the reference voltages (VA, VB).

Sixth Embodiment

Figure 16:
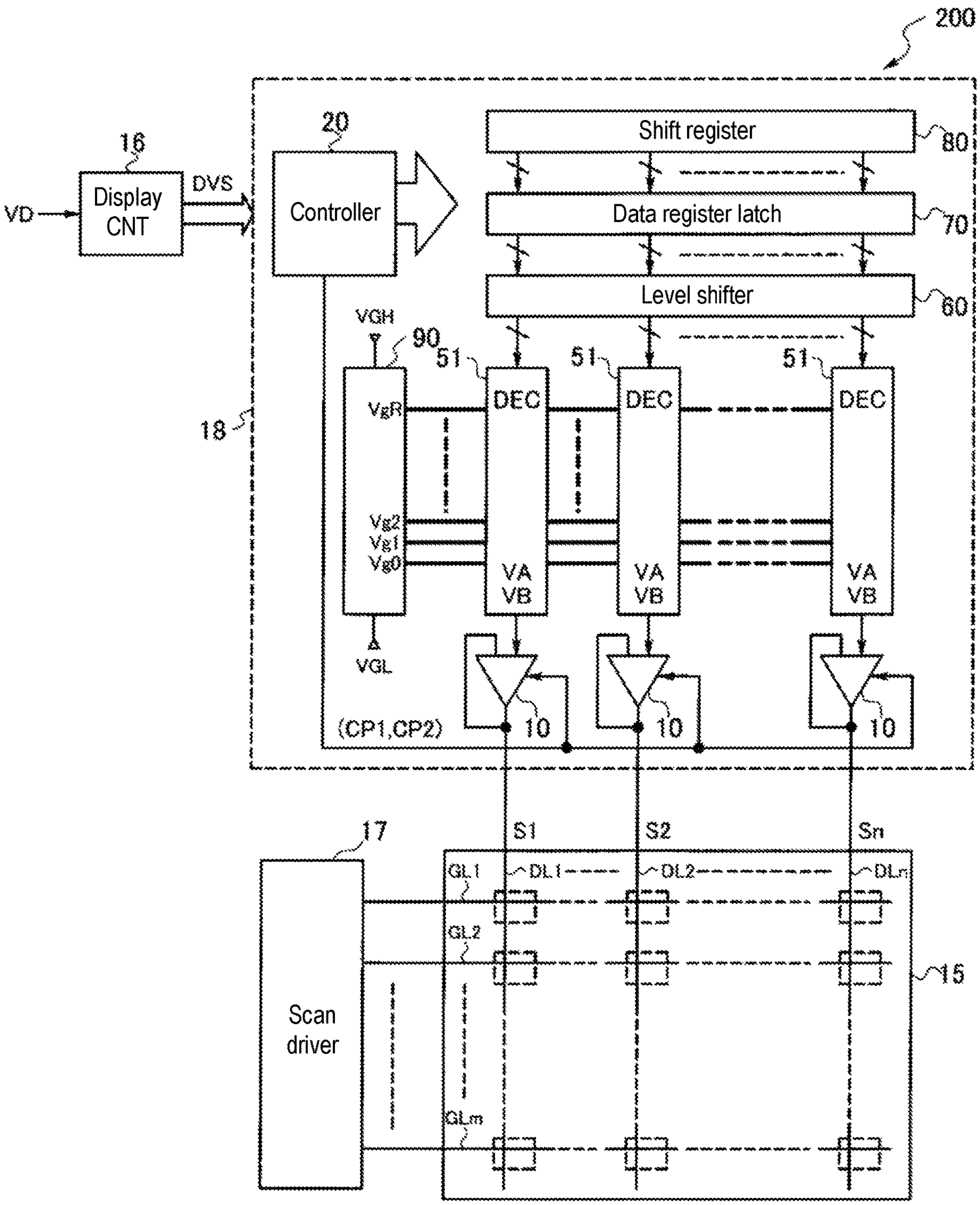
FIG. 16 is a block diagram showing the configuration of the display device to which the digital-to-analog converter according to the disclosure is applied.

The digital-to-analog converter 101 shown in FIG. 14 can be applied to a data driver of a display device. FIG. 16 shows the schematic configuration of a display device 200 including a data driver according to the disclosure.

The display device 200 includes a display panel 15, a display controller 16, a scan driver 17, and a data driver 18.

The display panel 15 is composed of, for example, a liquid crystal or organic EL panel, and includes m horizontal scan lines GL1 to GLm (m is a natural number of 2 or more) extending in the horizontal direction of the two-dimensional screen, and n data lines DL1 to DLn (n is a natural number of 2 or more) extending in the vertical direction of the two-dimensional screen. A display cell serving as a pixel is formed at each intersection of the horizontal scan lines and the data lines.

Based on a video signal VD, the display controller 16 generates a video digital signal DVS that includes various control signals such as a start pulse, a clock signal CLK, and vertical and horizontal synchronization signals, and a series of video digital data pieces representing the brightness level of each pixel.

The display controller 16 generates a scan timing signal synchronized with the above-mentioned horizontal synchronization signal and supplies the same to the scan driver 17, and supplies the above-mentioned video digital signal DVS to the data driver 18.

The scan driver 17 sequentially applies a horizontal scan pulse to each of the horizontal scan lines GL1 to GLm of the display panel 15 based on the scan timing signal supplied from the display controller 16.

The data driver 18 includes a controller 20, a shift register 80, a data register latch 70, a level shifter 60, a reference voltage group generation part 90, n decoders 51, and n differential amplifiers 10.

Based on the video signal VD, the display controller 16 generates the video digital signal DVS that includes various control signals such as a start pulse, a clock signal CLK, and vertical and horizontal synchronization signals, and a series of video digital data pieces representing the brightness level of each pixel as a digital value, and supplies the same to the controller 20 of the data driver 18. The controller 20 separates the video digital signal DVS and various control signals from the video signal VD, and supplies the same to each block that requires control.

The shift register 80 generates a plurality of latch timing signals for selecting latches in synchronization with the clock signal CLK according to the clock CLK signal and the start pulse supplied from the controller 20, and supplies the same to the data register latch 70.

The data register latch 70 captures the video digital data pieces included in the video digital signal DVS every predetermined number (for example, n pieces) based on the video digital signal DVS supplied from the controller 20 and each of the latch timing signals supplied from the shift register 80, and supplies n video digital data signals representing each video digital data piece to the level shifter 60.

The level shifter 60 performs level shift processing for each of the n video digital data signals supplied from the data register latch 70 to increase the signal amplitude, and supplies the obtained n level-shifted video digital data signals to each decoder 51.

The reference voltage group generation part 90 receives a DC reference power supply voltage VGH and a reference power supply voltage VGL lower than the reference power supply voltage VGH. The reference voltage group generation part 90 generates reference voltages Vg0 to VgR having different voltage values based on the reference power supply voltages VGH and VGL, and supplies the reference voltages Vg0 to VgR to each of the n decoders 51 provided respectively corresponding to the n output channels of the data driver 18.

Each of the decoders 51 selects a pair of reference voltages corresponding to the video digital data signal level-shifted by the level shifter 60 from the reference voltage group described above. Then, each of the decoders 51 supplies the selected pair of reference voltages as two voltages (VA, VB) to the differential amplifiers 10 provided respectively corresponding to the n output channels of the data driver 18.

The differential amplifier 10 generates one of, for example, 16 levels of output voltage Vout that divides the voltage between the input voltages VA and VB, and outputs a drive signal having this output voltage Vout. At this time, the n drive signals output from the n differential amplifiers 10 are respectively supplied to the data lines DL1 to DLn of the display panel 15 as drive signals S1 to Sn.

Here, the digital-to-analog converter 101 shown in FIG. 14 can be applied as the decoder 51, the differential amplifier 10, and the reference voltage group generation part 90 provided for each output of the data driver 18 shown in FIG. 16.

That is, the decoder 51 shown in FIG. 16 selects a pair of mutually adjacent two voltages (VA, VB) from the reference voltages Vg0 to VgR generated by the reference voltage group generation part 90 based on the video digital data signal supplied from the level shifter 60. Then, the decoder 51 uses the selected two voltages (VA, VB) to generate combination voltages V<1> to V<$2^K$> composed of $2^K$ voltages, and supplies the voltages V<1> to V<$2^K$> to the differential amplifier 10. Further, control signals (CP1, CP2) are supplied from the controller 20 to the differential amplifier 10. As described above, the differential amplifier 10 includes $2^K$ differential pairs and the MUX 40, and supplies the voltages V<1> to V<2"> to one of the first differential input terminal and the second differential input terminal of each of the $2^K$ differential pairs via the MUX 40 and supplies the feedback voltage FB to the other of the first differential input terminal and the second differential input terminal of each of the $2^K$ differential pairs. The control signals (CP1, CP2) are supplied to the MUX 40 to switch and control the supply of the voltages V<1> to V<$2^K$> and the feedback voltage FB to the first differential input terminal and the second differential input terminal of each of the $2^K$ differential pairs in the first and second states based on the control signals (CP1, CP2). In addition, in the MUX 40, the voltages V<1> to V<$2^K$> supplied from the decoder 51 and the $2^K$ differential pairs are respectively divided into two groups of the same number. Then, in the first state controlled by the control signal CP1, the voltages of one group of the voltages V<1> to V<$2^K$> divided into two groups are respectively supplied to the first differential input terminals of one group of the differential pairs divided into two groups among the first differential input terminals of the $2^K$ differential pairs, and the voltages of the other group of the voltages V<1> to V<$2^K$> divided into two groups are respectively supplied to the first differential input terminals of the other group of the differential pairs divided into two groups among the first differential input terminals of the $2^K$ differential pairs. Further, the feedback voltage FB is supplied to all of the second differential input terminals of the $2^K$ differential pairs. On the other hand, in the second state controlled by the control signal CP2, the voltages of one group of the voltages V<1> to V<$2^K$> divided into two groups are respectively supplied to the second differential input terminals of the other group of the differential pairs divided into two groups among the second differential input terminals of the $2^K$ differential pairs, and the voltages of the other group of the voltages V<1> to V<$2^K$> divided into two groups are respectively supplied to the second differential input terminals of one group of the differential pairs divided into two groups among the second differential input terminals of the $2^K$ differential pairs. Further, the feedback voltage FB is supplied to all of the first differential input terminals of the $2^K$ differential pairs.

Furthermore, within the differential amplifier 10, in the first state controlled by the control signal CP1, one input terminal connected to the node n11 becomes a non-inverting input terminal (+), and the other input terminal connected to the node n12 becomes an inverting input terminal (−). In the second state controlled by the control signal CP2, one input terminal connected to the node n11 becomes an inverting input terminal (−), and the other input terminal connected to the node n12 becomes a non-inverting input terminal (+). Thus, in each of the first and second states, the amplification stage 30 performs an amplification operation with the non-inverting input terminal (+) and the inverting input terminal (−) reversed, and generates a drive signal having the output voltage Vout.

By applying the digital-to-analog converter 101 shown in FIG. 14 in this way, it is possible to realize a data driver with highly accurate output and small voltage variations when outputting drive signals of the same gradation among multiple outputs while saving area.

Seventh Embodiment

Figure 17:
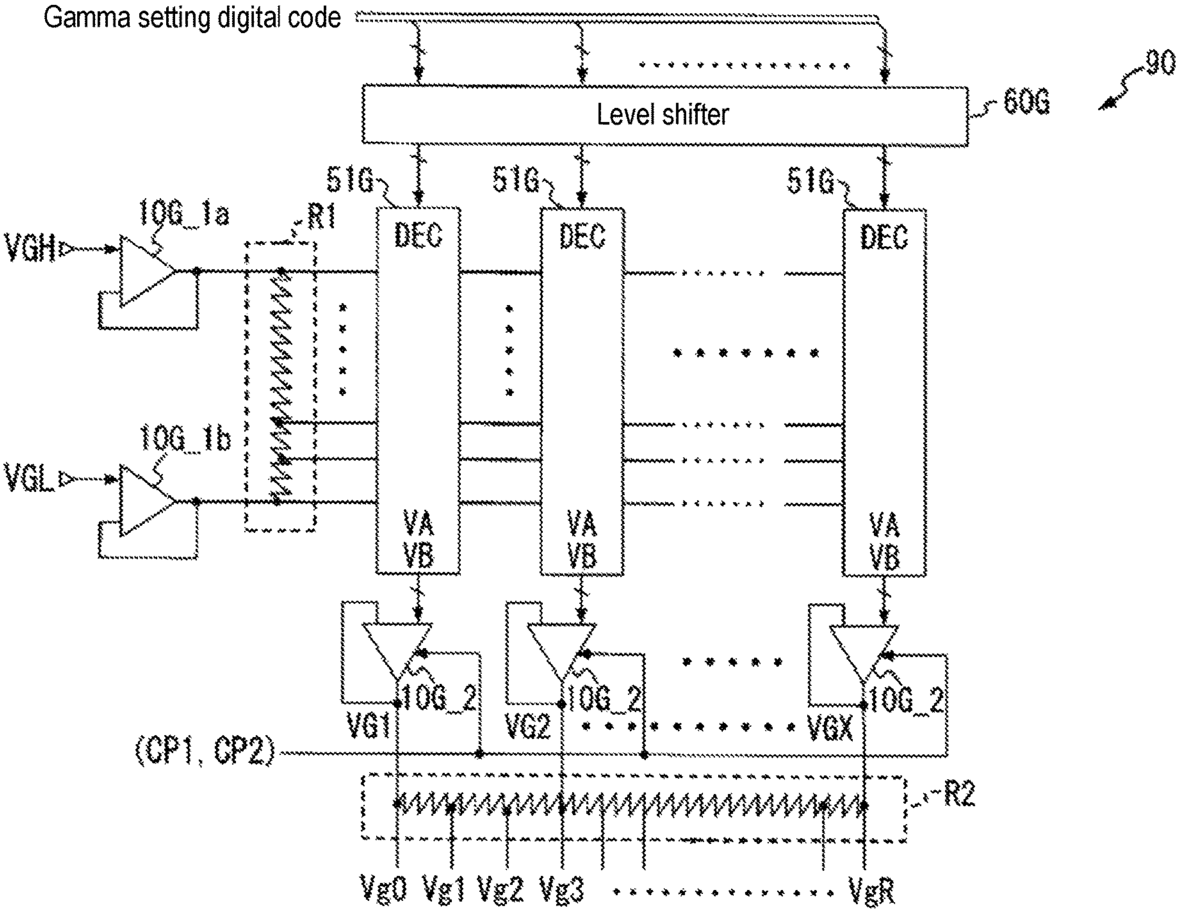
FIG. 17 is a block diagram showing the configuration of the reference voltage group generation part to which the digital-to-analog converter according to the disclosure is applied.

Furthermore, the digital-to-analog converter 100 shown in FIG. 1 can be applied to the reference voltage group generation part 90 in the data driver 18 described above. FIG. 17 is a circuit diagram showing an example of the internal configuration of the reference voltage group generation part 90 shown in FIG. 14 and FIG. 16.

The reference voltage group generation part 90 generates a plurality of gamma power supply voltages each having a voltage value in accordance with gamma characteristics, which match the display characteristics of the display panel 15, according to a gamma setting digital code, and generates reference voltages Vg0 to VgR (R is an integer of 2 or more) based on the plurality of gamma power supply voltages.

As shown in FIG. 17, the reference voltage group generation part 90 includes differential amplifiers 10G_1*a* and 10G_1*b*, ladder resistors R1 and R2, x (x is an integer of 3 or more) decoders 51G, x gamma amplifiers 10G-2, and a level shifter 60G.

The differential amplifier 10G_1*a* applies a voltage obtained by current-amplifying a reference power supply voltage VGH having a gamma reference voltage supplied from outside to one end of the ladder resistor R1.

The differential amplifier 10G_1*b* applies a voltage obtained by current-amplifying a reference power supply voltage VGL, which is supplied from outside and indicates a gamma reference voltage lower than the reference power supply voltage VGH, to the other end of the ladder resistor R1.

The ladder resistor R1 divides the voltages applied to one end and the other end thereof to generate a plurality of linearly divided voltages, and supplies the same to each of the x decoders 51G.

The level shifter 60G receives, for example, a 10- to 12-bit gamma setting digital code, and supplies gamma setting digital code pieces each having 10 to 12 bits, obtained by performing level shift processing to increase the signal amplitude of the signal level of each bit, to the x decoders 51G.

Each of the decoders 51G selects two linearly divided voltages adjacent to each other as two voltages (VA, VB) based on the gamma setting digital data piece from the plurality of linearly divided voltages generated by the ladder resistor R1, and further distributes the selected voltage VA or VB as an input voltage to each of the plurality of differential pairs of the gamma amplifier 10G-2.

Each gamma amplifier 10G-2 is composed of, for example, the differential amplifier 10 shown in FIG. 1 or FIG. 14, and outputs each voltage level, obtained by dividing the voltage between the voltages VA and VB based on the input voltages $V<1>$ to $V<2^K>$ to which the voltages VA and VB are respectively distributed, as a gamma power supply voltage. The x gamma power supply voltages respectively output from the predetermined number (x) of gamma amplifiers 10G-2 are supplied to both end taps and the middle tap of the ladder resistor R2 as gamma power supply voltages VG1 to VGX. Thereby, the ladder resistor R2 generates the reference voltages Vg0 to VgR (R is an integer of 2 or more) corresponding to the gamma characteristics.

Thus, the digital-to-analog converter 101 shown in FIG. 14 can be applied as the decoder 51G, gamma amplifier 10G_2 and ladder resistors R1 shown in FIG. 17. As a result, when constructing a data driver of a display device from a plurality of chips, it is possible to realize a data driver with highly accurate output and small voltage variations among the plurality of chips.

What is claimed is:

1. A digital-to-analog converter, comprising:

a first decoder that receives a K-bit (K is a positive number of 2 or more) digital data signal, a first voltage, and a second voltage at a different voltage level from the first voltage, and generates $2^K$ voltages each indicating the first voltage or the second voltage according to the digital data signal; and a differential amplifier that outputs an output voltage having one of $2^K$ voltage levels obtained by dividing a voltage between the first voltage and the second voltage into $2^K$ voltage levels according to the $2^K$ voltages, wherein the differential amplifier comprises:

$2^K$ differential pairs each comprising first and second differential input terminals and first and second differential output terminals, wherein the first differential output terminals are connected to a first node, and the second differential output terminals are connected to a second node;

an amplification stage comprising a non-inverting input terminal and an inverting input terminal, wherein the non-inverting input terminal is connected to the first node and the inverting input terminal is connected to the second node in a first state, the non-inverting input terminal is connected to the second node and the inverting input terminal is connected to the first node in a second state, and the amplification stage outputs the output voltage according to input voltages respectively to the non-inverting input terminal and the inverting input terminal; and a multiplexer comprising $2^K$ input terminals that receive the $2^K$ voltages from the first decoder, wherein in the first state, the multiplexer supplies voltages of the input terminals of one of two groups which are obtained by dividing the $2^K$ input terminals into two groups of the same number of input terminals respectively to the first differential input terminals of the differential pairs of one of two groups which are obtained by dividing the $2^K$ differential pairs into two groups of the same number of differential pairs, supplies voltages of the input terminals of the other of the two groups of input terminals respectively to the first differential input terminals of the differential pairs of the other of the two groups of differential pairs, and supplies the output voltage to the second differential input terminals of all of the $2^K$ differential pairs, and in the second state, the multiplexer supplies the voltages of the input terminals of one group respectively to the second differential input terminals of the differential pairs of the other group, supplies the voltages of the input terminals of the other group respectively to the second differential input terminals of the differential pairs of one group, and supplies the output voltage to the first differential input terminals of all of the $2^K$ differential pairs.

2. The digital-to-analog converter according to claim 1, further comprising a second decoder that selects adjacent two reference voltages from a plurality of reference voltages at different voltage levels based on a digital value of upper (M-K) bits of an M-bit (M is a positive number greater than K) digital data signal, and respectively supplies the two reference voltages as the first voltage and the second voltage to the first decoder.

3. The digital-to-analog converter according to claim 2, further comprising a reference voltage group generation part that generates the plurality of reference voltages.

4. The digital-to-analog converter according to claim 3, wherein the reference voltage group generation part comprises:

a first ladder resistor to which predetermined power supply voltages are applied at both ends, and which generates a plurality of gamma reference voltages by resistance division;

a third decoder receiving the plurality of gamma reference voltages, selecting adjacent two gamma reference voltages from the plurality of gamma reference voltages based on a gamma setting digital code, and distributing one or the other of the two gamma reference voltages as a plurality of gamma input voltages;

a plurality of gamma amplifiers each comprising a plurality of input terminals and each outputting a weighted average voltage of the gamma input voltages received at the plurality of input terminals as a gamma power supply voltage; and a second ladder resistor receiving the gamma power supply voltages respectively output from the plurality of gamma amplifiers to a plurality of taps, and generating the plurality of reference voltages by resistance division between the plurality of taps.

5. The digital-to-analog converter according to claim 4, wherein the first decoder to which the gamma setting digital code is input as the digital data signal and the two gamma reference voltages are input as the first voltage and the second voltage is applied to the third decoder, and the differential amplifier is applied to each of the plurality of gamma amplifiers.

6. The digital-to-analog converter according to claim 1, wherein the amplification stage and the multiplexer switch between the first state and the second state according to a control signal.

7. The digital-to-analog converter according to claim 6, wherein the control signal has a first period and a second period for alternately switching at a predetermined cycle, and designates the first state during the first period and designates the second state during the second period.

8. The digital-to-analog converter according to claim 7, wherein the multiplexer comprises:

a first switch group whose number is twice the number of $2^K$ and each of which is turned on in the first state according to the control signal, and which supplies the voltages of the input terminals of one group respectively to the second differential input terminals of the differential pairs of one group, supplies the voltages of the input terminals of the other group respectively to the second differential input terminals of the differential pairs of the other group, and supplies the output voltage to the second differential input terminals of all of the $2^K$ differential pairs; and a second switch group whose number is twice the number of $2^K$ and each of which is turned on in the second state according to the control signal, and which supplies the voltages of the input terminals of one group respectively to the second differential input terminals of the differential pairs of the other group, supplies the voltages of the input terminals of the other group respectively to the second differential input terminals of the differential pairs of one group, and supplies the output voltage to the first differential input terminals of all of the $2^K$ differential pairs.

9. The digital-to-analog converter according to claim 7, wherein in a case where the multiplexer comprises a plurality of terminals at which voltages respectively supplied from the $2^K$ input terminals to the first differential input terminals and the second differential input terminals of the $2^K$ differential pairs are the same regardless of the K-bit digital data signal in each of the first state and the second state, terminals corresponding to the plurality of terminals among the $2^K$ input terminals are shared, terminals corresponding to the plurality of terminals among the first differential input terminals of the $2^K$ differential pairs are shared, terminals corresponding to the plurality of terminals among the second differential input terminals of the $2^K$ differential pairs are shared, and further a plurality of switches connected between the shared terminals among the first switch group and the second switch group, which have switches whose number is twice the number of $2^K$, are also shared.

10. The digital-to-analog converter according to claim 6, wherein the multiplexer comprises:

a first switch group whose number is twice the number of $2^K$ and each of which is turned on in the first state according to the control signal, and which supplies the voltages of the input terminals of one group respectively to the second differential input terminals of the differential pairs of one group, supplies the voltages of the input terminals of the other group respectively to the second differential input terminals of the differential pairs of the other group, and supplies the output voltage to the second differential input terminals of all of the $2^K$ differential pairs; and a second switch group whose number is twice the number of $2^K$ and each of which is turned on in the second state according to the control signal, and which supplies the voltages of the input terminals of one group respectively to the second differential input terminals of the differential pairs of the other group, supplies the voltages of the input terminals of the other group respectively to the second differential input terminals of the differential pairs of one group, and supplies the output voltage to the first differential input terminals of all of the $2^K$ differential pairs.

11. The digital-to-analog converter according to claim 6, wherein in a case where the multiplexer comprises a plurality of terminals at which voltages respectively supplied from the $2^K$ input terminals to the first differential input terminals and the second differential input terminals of the $2^K$ differential pairs are the same regardless of the K-bit digital data signal in each of the first state and the second state, terminals corresponding to the plurality of terminals among the $2^K$ input terminals are shared, terminals corresponding to the plurality of terminals among the first differential input terminals of the $2^K$ differential pairs are shared, terminals corresponding to the plurality of terminals among the second differential input terminals of the $2^K$ differential pairs are shared, and further a plurality of switches connected between the shared terminals among the first switch group and the second switch group, which have switches whose number is twice the number of $2^K$, are also shared.

12. A data driver, comprising a plurality of the digital-to-analog converters according to claim 1, wherein the data driver converts each of video digital data pieces representing a brightness level of each pixel as a digital value into a plurality of the output voltages each having an analog voltage level by the plurality of digital-to-analog converters, and respectively supplies a plurality of drive signals each having the plurality of output voltages to a plurality of data lines of a display panel.

13. A display device, comprising:

a display panel comprising a plurality of data lines to which a plurality of display cells are respectively connected; and a data driver comprising a plurality of the digital-to-analog converters according to claim 1, converting each of video digital data pieces representing a brightness level of each pixel as a digital value into a plurality of the output voltages each having an analog voltage level by the plurality of digital-to-analog converters, and respectively supplying a plurality of drive signals each having the plurality of output voltages to the plurality of data lines of the display panel.

* * * * *